United States Patent
Roseman

(10) Patent No.: US 9,115,691 B2
(45) Date of Patent: Aug. 25, 2015

(54) WIND ENERGY CAPTURE DEVICE FOR A SYSTEM FOR PRODUCING ELECTRICITY FROM JETSTREAMS

(71) Applicant: Yehuda Roseman, Shimshon (IL)

(72) Inventor: Yehuda Roseman, Shimshon (IL)

(*) Notice: Subject to any disclaimer, the term of this patent is extended or adjusted under 35 U.S.C. 154(b) by 0 days.

(21) Appl. No.: 14/197,048

(22) Filed: Mar. 4, 2014

(65) Prior Publication Data

US 2014/0175797 A1   Jun. 26, 2014

Related U.S. Application Data

(63) Continuation-in-part of application No. 12/324,861, filed on Nov. 27, 2008, now Pat. No. 8,704,397, and a continuation-in-part of application No. 11/148,267, filed on Jun. 9, 2005, now abandoned.

(51) Int. Cl.
| | |
|---|---|
| *F03D 11/04* | (2006.01) |
| *F03D 9/00* | (2006.01) |
| *F03D 11/00* | (2006.01) |
| *F03D 5/02* | (2006.01) |

(52) U.S. Cl.
CPC ........ *F03D 9/002* (2013.01); *F03D 5/02* (2013.01); *F03D 11/0033* (2013.01); *F03D 11/04* (2013.01); *F05B 2240/921* (2013.01); *F05B 2240/922* (2013.01); *Y02E 10/70* (2013.01); *Y02E 10/725* (2013.01); *Y02E 10/728* (2013.01)

(58) Field of Classification Search
USPC .......................................................... 290/55
See application file for complete search history.

(56) References Cited

U.S. PATENT DOCUMENTS

| | | | | |
|---|---|---|---|---|
| 1,526,631 | A | * | 2/1925 | Fagan ................................ 416/8 |
| 3,426,214 | A | | 2/1969 | O'Malley |
| 3,730,643 | A | * | 5/1973 | Davison ............................ 416/8 |
| 3,924,827 | A | * | 12/1975 | Lois .......................... 244/153 R |
| 3,927,330 | A | * | 12/1975 | Skorupinski ..................... 290/54 |
| 3,957,390 | A | * | 5/1976 | Miller ............................... 415/5 |
| 3,992,125 | A | * | 11/1976 | Schilling .......................... 415/5 |
| 4,073,516 | A | | 2/1978 | Kling |
| 4,075,545 | A | * | 2/1978 | Haberer ......................... 322/35 |
| 4,084,102 | A | | 4/1978 | Fry et al. |
| 4,165,468 | A | | 8/1979 | Fry et al. |
| 4,166,596 | A | * | 9/1979 | Mouton et al. .................. 244/30 |
| 4,186,314 | A | * | 1/1980 | Diggs ............................. 290/55 |
| 4,204,126 | A | * | 5/1980 | Diggs ............................. 290/55 |
| 4,309,006 | A | | 1/1982 | Biscomb |
| 4,450,364 | A | | 5/1984 | Benoit |
| 4,486,669 | A | | 12/1984 | Pugh |
| 4,494,008 | A | * | 1/1985 | Patton ............................ 290/44 |
| 4,536,125 | A | * | 8/1985 | Herman et al. .................... 415/5 |
| 4,572,962 | A | | 2/1986 | Shepard |

(Continued)

FOREIGN PATENT DOCUMENTS

| | | | |
|---|---|---|---|
| GB | 489139 A | * | 6/1938 |
| GB | 1588600 A | * | 4/1981 |

*Primary Examiner* — Joseph Waks
(74) *Attorney, Agent, or Firm* — Mark David Torche Patwrite LLC

(57) ABSTRACT

A jet stream wind energy capture device including two pair of parallel sail line tracks. Each track pair includes chain support beams; a plurality of rotatable chain gears connected to the support beams of each track; and sail-line chains that ride upon the chain gears. Generator(s) are attached to the gears. At least one sail is attached to the chains whereby the sails move along the tracks in a cyclical downwind and upwind path thereby moving the chains to rotate their chain gears, which in turn provides energy to the generator(s).

8 Claims, 18 Drawing Sheets

(56) References Cited

U.S. PATENT DOCUMENTS

| | | |
|---|---|---|
| 4,659,940 A | 4/1987 | Shepard |
| 4,708,592 A | 11/1987 | Krolick et al. |
| 5,182,458 A | 1/1993 | McConanchy |
| 6,057,606 A | 5/2000 | Porat |
| 6,474,595 B1 | 11/2002 | Herman |
| 6,523,781 B2 | 2/2003 | Ragner |
| 6,555,931 B2 | 4/2003 | Mizzi |
| 6,749,393 B2 * | 6/2004 | Sosonkina ............ 415/4.1 |
| 6,781,254 B2 | 8/2004 | Roberts |
| 7,183,663 B2 | 2/2007 | Roberts et al. |
| 7,275,719 B2 | 10/2007 | Olson |

\* cited by examiner

VIEW A-A

WIND ENERGY CAPTURE DEVICE FOR A SYSTEM FOR PRODUCING ELECTRICITY FROM JETSTREAMS

RELATED APPLICATIONS

This application is a continuation-in-part of U.S. patent application Ser. No. 12/324,861, filed Nov. 27, 2008 entitled "System for producing electricity from jetstreams and tower therefor", which is a continuation-in-part of U.S. patent application Ser. No. 11/148,267, filed Jun. 9, 2005, entitled "Producing useful electricity from jetstreams" the complete disclosures of which are incorporated herein by reference for all purposes.

FIELD OF THE INVENTION

The present invention relates to a system to produce relatively low cost electric energy from the jet stream.

BACKGROUND OF THE INVENTION

Jet streams are high velocity winds, blowing at great heights above the earth's surface. These winds are typically found at altitudes between 11 and 13 km (air pressure of 200 millibars). The thickness (i.e. height) of a typical jet stream is about 3 km, its width is about 60 km, and its length can be hundreds or thousands of km. The average daily maximal speed of the jet streams is about 120 km per hour above Israel, 240 km/hour above Europe and the U.S.A. and 360 km/hour above Japan. Jet streams typically obtain a maximum speed of about 200 km/hour above Israel, 370 km/hour above Europe and the U.S.A. and 550 km/hour over Japan.

The significance of these speeds, when expressed in terms of the power they can yield is understood from the equation $P=\frac{1}{2} mv^2=\rho v^3$ reflecting the wind's power, where P=power in watts; m=mass flux rate in kg-mass air per second through an area of one $m^2$ normal to the earth's surface; v=wind velocity in meters/second; and $\rho$=wind density in $kg/m^3$. Even though $\rho$ at high altitudes is about a quarter of its value at sea-surface height, this factor is of little importance versus the $v^3$ term in the equation noted hereinabove.

To take advantage of jet stream energy, in U.S. Pat. No. 3,426,214, O'Malley discloses an electric power generating system including a high tower whose height is sufficient to extend into the high wind or jet stream layers of the atmosphere. The high tower has a plurality of spaced wind driven electric generators mounted thereon. Details regarding design of the high tower, such as the materials, size and so on, are not disclosed.

Examples of generators or turbines, dynamos, or other apparatus to convert wind power into useful energy that may be used, include those mentioned in U.S. Pat. No. 3,924,827 (Lois); U.S. Pat. No. 4,073,516 (Kling); U.S. Pat. No. 4,084,102 and U.S. Pat. No. 4,165,468 (Fry); U.S. Pat. No. 4,450,364 (Benoit); U.S. Pat. No. 4,166,596 (Mouton Jr. et al); U.S. Pat. No. 4,309,006 (Biscomb); U.S. Pat. No. 4,486,669 (Pugh); U.S. Pat. No. 4,572,962 and U.S. Pat. No. 4,659,940 (Shepard); U.S. Pat. No. 4,708,592 (Krolick et al); U.S. Pat. No. 5,182,458 (McConanchy); U.S. Pat. No. 6,057,606 (Porat); U.S. Pat. No. 6,474,595 (Herman); U.S. Pat. No. 6,523,781 (Ragner); U.S. Pat. No. 6,555,931 (Mizzi); U.S. Pat. No. 6,781,254 (Roberts); U.S. Pat. No. 7,183,663 (Roberts et al); U.S. Pat. No. 7,275,719 (Olson), which are incorporated herein by reference, in their entirety.

SUMMARY OF THE INVENTION

The present invention relates to a system for producing electricity from jet streams and a pipeline or tower therefor. Such a tower may have several uses, for example meteorological, for scanning vast areas below, and so on; however the tower will be described in relation to use in harnessing wind power. According to the teachings of the present invention, there is provided a system for producing electricity from jet streams including a pipeline having a length extending from a ground surface to an altitude wherein jet streams exist; and a wind to energy converter, for example, including at least one generator having a wind receiving mechanism such as a propeller. Preferably, the pipeline is self-supporting. Most preferably, the pipeline is formed from a plurality of modules positioned sequentially above each other. Typically, each individual module of the plurality of modules is designed to be self-supporting due to their buoyancy.

Most preferably, the modules have a hollow, substantially cylindrical shape, having a slightly truncated conical shape and having a smaller lower diameter base and a larger upper diameter base. According to some embodiments, the modules further have a lateral wall whose thickness decreasingly varies from its lower diameter base to its upper diameter base.

Accordingly, the present invention provides a structure extending from a ground level to a higher altitude, including a plurality of modules sequentially positioned above each other and operably attached one to the next, wherein the structure is substantially self-supporting by buoyancy of the modules adapted to house a lighter than air gas or gas mixture.

The present invention further provides a system for producing electrical energy from wind energy including the aforementioned structure and apparatus for converting wind energy to electrical energy.

According to some embodiments, the system includes a wind energy capture device or sail line operably attachable to and for use in conjunction with a mechanism for securing the wind energy capture device at high altitudes (e.g. the tower). The wind energy capture device includes:

(a) a first pair of essentially parallel sail line tracks, each track of the first pair of parallel sail line tracks including:

a first sail-line chain support beam operably connected to the mechanism for securing the wind energy capture device at high altitudes;

a plurality of spaced-apart rotatable chain gears rotatably connected to the first sail-line chain support beams of each track; and a first sail-line chain that rides upon the rotatable chain gears of the first sail-line chain support beams of each track, (b) a second pair of essentially parallel sail line tracks, each track of the second pair of parallel sail line tracks including:

a second sail-line chain support beam operably connected to the mechanism for securing the wind energy capture device at high altitudes;

a plurality of spaced-apart rotatable chain gears rotatably connected to the second sail-line chain support beams of each track; and a second sail-line chain that rides upon the rotatable chain gears of the second sail-line chain support beams of each track.

The device further includes at least one generator operably and respectively attached to at least one of the gears; and at least one sail having a sail frame attached to the first pair of chains and to the second pair of chains.

In operation, sails move along the pairs of first and second tracks on the first and second chains in a cyclical downwind and upwind path thereby moving the first and second chains to rotate their respective first and second chain gears, which in turn provides energy to the at least one generator.

In some embodiments, each track of the pair of second sail line tracks are respectively disposed above each track of the pair of first sail line tracks.

In some embodiments, each track of the pair of second sail line tracks respectively surround each track of the pair of first sail line tracks.

In some embodiments, one or more sail of the sail line are moved by the jet stream at a speed controlled to vary between less than half and one third of the wind velocity of the jet stream. Typically, the sail line is mechanically connected to the at least one generator. According to some embodiments, one or more of the generators is located on the ground; while according to other embodiments, they are located somewhere along pipeline; and according to still other embodiments, the generators are located at the top of the tower or at the sail line, According to certain embodiments, the length of the pipeline is substantially 17 km.

BRIEF DESCRIPTION OF THE DRAWINGS

The invention is herein described, by way of example only, with reference to the accompanying drawings, wherein.

Figure 1:
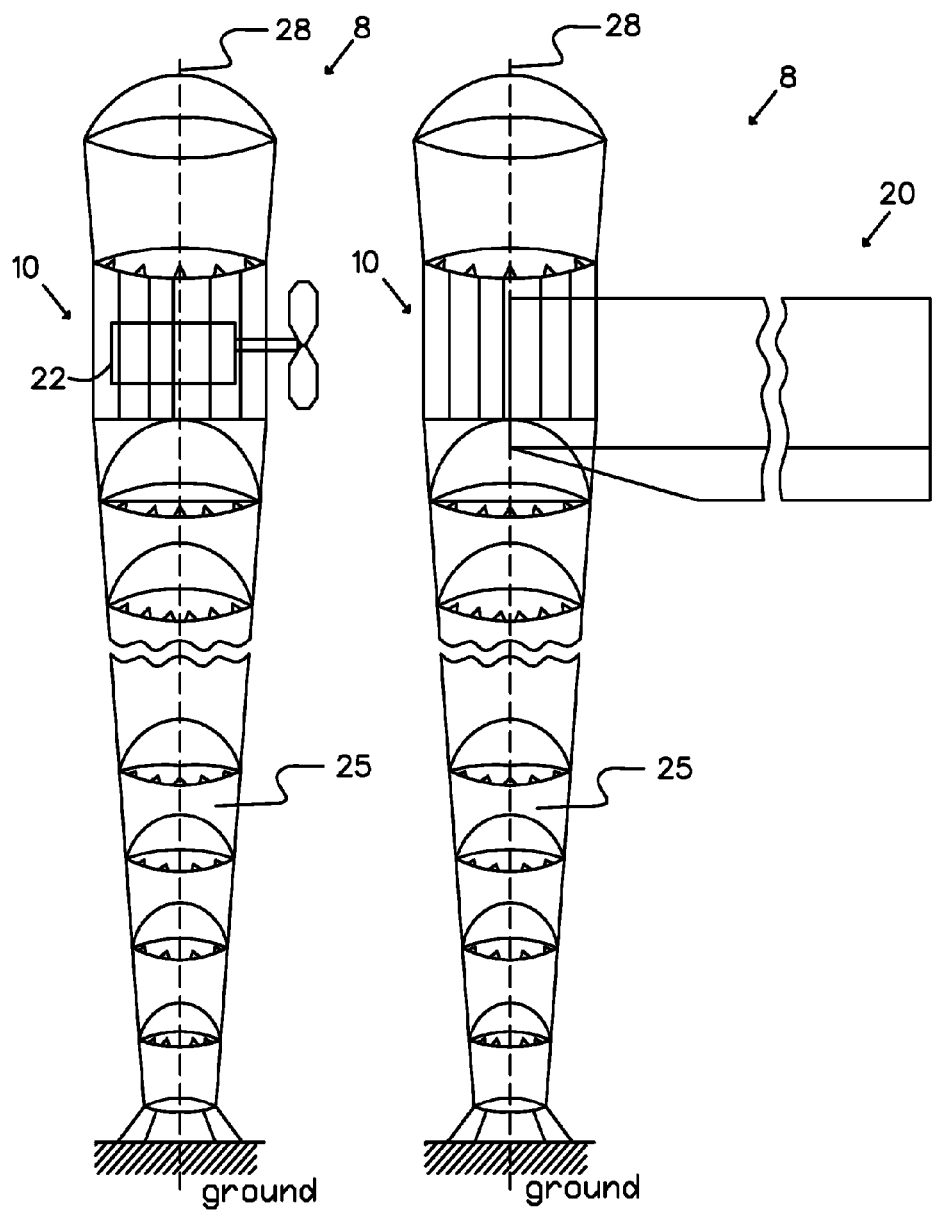
FIG. 1A is a representation of a tower or pipeline in accordance with an embodiment of the present invention.
FIG. 1B is a representation of a system for producing electricity from jet streams having a pipeline and a schematically depicted sail line, in accordance with an embodiment of the present invention.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION

Illustrative embodiments of the invention are described below. In the interest of clarity, not all features/components of an actual implementation are necessarily described.

The present invention relates to a system for producing electricity from jet streams and a tower ("pipeline") therefor. Embodiments of the current invention represent a contribution to a solution to the world's energy problem and they can be applied in all the large industrial countries: Japan, USA, and most of European countries (and in most other countries too), supplying great quantities of energy.

Reference is now made to FIG. 1A, which is a representation of a system for producing electricity from jet streams 8 having a pipeline 10 (tower) and a sail line 20, in accordance with an embodiment of the present invention. Pipeline 10, extends between the ground and a high altitude in which the jet streams blow; and sail line 20 or "fan line", is positioned near or at the top (i.e. high altitude) of pipeline 10, which may serve to operate one or more generators 22 (one shown) for electricity production (FIG. 1B). Generators 22 include a wind receiving mechanism such as a propeller that converts the linearly directed wind energy into a rotational force. Pipeline 10 is built from a plurality of modules 25, described hereinbelow. Pipeline 10 has an axis 28 passing from ground level to the top of the pipeline.

Examples of such generators (or turbines, dynamos, or other apparatus to convert wind power into useful energy) that may be used include those disclosed in U.S. Pat. No. 3,426, 214 (O'Malley); U.S. Pat. No. 3,924,827 (Lois); U.S. Pat. No. 4,073,516 (Kling); U.S. Pat. No. 4,084,102 and U.S. Pat. No. 4,165,468 (Fry); U.S. Pat. No. 4,450,364 (Benoit); U.S. Pat. No. 4,166,596 (Mouton Jr. et al); U.S. Pat. No. 4,309,006 (Biscomb); U.S. Pat. No. 4,486,669 (Pugh); U.S. Pat. No. 4,572,962 and U.S. Pat. No. 4,659,940 (Shepard); U.S. Pat. No. 4,708,592 (Krolick et al); U.S. Pat. No. 5,182,458 (McConanchy); U.S. Pat. No. 6,057,606 (Porat); U.S. Pat. No. 6,474,595 (Herman); U.S. Pat. No. 6,523,781 (Ragner); U.S. Pat. No. 6,555,931 (Mizzi); U.S. Pat. No. 6,781,254 (Roberts); U.S. Pat. No. 7,183,663 (Roberts et al); U.S. Pat. No. 7,275,719 (Olson), which are incorporated herein by reference, in their entirety.

It should be noted that jet stream wind velocity is not constant. As a result, effective use of the energy produced in embodiments of system may be by way of a large battery subsystem (not shown in the figures) that stores energy produced by system. The battery subsystem subsequently feeds electric current to a power station (not shown in the figure).

Equations are presented hereinbelow showing calculations of dimensions of modules 25 for pipeline 10. Modules 25 and other system parts are typically very large. It is not difficult for a large industrial firm to produce these parts and special facilities may have to be built to produce the parts. One consideration for production of the parts is that the length of pipeline 10 may be substantially shorter if the pipeline is mounted on a high mountain.

Module 25 may include a hardened steel pipe, with a substantially cylindrical shape, but having a slightly truncated cone-like shape, with the wider base of the cone facing upwards (away from the ground) and the narrower base facing downwards (towards the ground). In embodiments of the present invention, modules 25 may have a range of dimensions, based upon the overall size/capacity of system and upon other considerations such as: overall length of pipeline 10; ground level location (meaning near sea level or at a higher altitude); and module position within pipeline 10. Three exemplary dimensions of the module 25 are noted hereinbelow.

The terms "length" and "height", when used to describe modules 25 and pipeline 10 in the specification and claims hereinbelow are intended to mean a lateral dimension of the module and of pipeline, i.e. such as the distance between two bases.

Assuming that the ground level location is substantially a sea level, module 25 may have respective diameters of approximately 2,356, and 502 meters and respective lengths of approximately 90, 180, and 251 meters. In general, a system with pipeline 10 having a larger diameter can produce more energy, implying it may be more profitable to produce a system having larger diameters.

According to some embodiments, the wall thickness of module 25 near the lower part of pipeline 10 is approximately 10 mm due to safety requirement of withstanding a typical gun bullet penetration, which could cause a gas leak from the pipeline. In an embodiment of the invention, modules 25 are typically filled with hydrogen or helium with the fill gas pressure in pipeline 10 being equal to the atmospheric while air pressure outside of the pipeline at the corresponding altitude.

Figure 2:
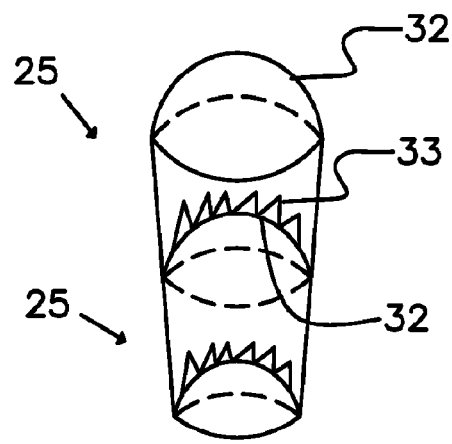
FIG. 2 is an illustrative diagram of two modules of the integrated pipeline of FIG. 1.

Reference is now made to FIG. 2, which is an illustrative diagram of two modules 25 of pipeline 10 of FIGS. 1A and 1B. Module 25 has a top seal 32 including a steel shell having a thickness of 1 mm, and having an outwardly extending arched shape such as: a semi-sphere; a truncated paraboloid; or other similar shape. Module 25 is sealed at its lower part with a closed bottom shell 33, made of a light material coated with plastic or rubber which is impermeable to gases and which may be folded, such as in an accordion-shape and may optionally be peeled off. The degree of folding of bottom shell 33 is such that when module 25 is located at lowest possible altitude, such as at ground level, where pipeline 10 may be constructed or serviced, bottom shell 33 does not tear due to the greater air pressure.

In this configuration, bottom shell 33 will expand and unfold until the internal pressure of module 25 reaches that of the ambient air pressure at the altitude to where module 25 has been lowered. In this way, servicing/construction of each module 25 is simplified in that it may be lowered or raised and equilibrium air pressures may be maintained. The configuration and construction of bottom shell 33 additionally mitigates or prevents compressive/expansion forces upon the module walls, preventing damage such as buckling.

The progressively larger diameter of successive modules 25 is determined so that the volume in each module along the pipeline height is inversely related to the ambient gas density at a given altitude. A calculation of progressively larger diameter successive modules is presented hereinafter.

Typically, the thickness of the module wall successively decreases with altitude, so that module weight is distributed evenly along the length of pipeline 10. In other words, as the diameter is increased, the wall thickness is decreased.

In embodiments of the invention, supporting systems are added (not shown in the figures) to some or all modules 25, such as: a local gas pressure monitor/sensor; a wind velocity monitor/sensor, and so on. Such monitors/sensors have negligible weight relative to the module weight. If the weight of such sensors is determined to be non-negligible, the lengths of respective modules 25 having these monitors/sensors are increased, thereby increasing the internal volume of the buoyant gas mentioned hereinabove, so that respective modules 25 will have an ambient net weight of zero or less.

During operation of the system, axis 28 is typically not normal to the ground surface. An inclination angle of axis 28 may vary during operation of the system based on a number of factors including: energy production level of the system (with inclination increasing as energy production increases); jet stream intensity, and jet stream direction, and allowable air space through which no aircraft may fly due to the presence of the system. The inclination angle of axis 28 may vary, for example, between 30 and 45 degrees. Once an inclination angle or a range of inclination angles is determined, other variables of the system, including but not limited to individual module dimensions (diameters, lengths, and thicknesses) and weights, as well as the base diameter (diameter of the lowest module, forming the base of the system) of the system may be determined.

Determination of the diameter of the base, or lowest, module infers the diameter and other dimensions of modules 25 above. There is a need to separately determine respective lengths of each module 25 since the weight of a top seal 32, the thickness of the top seal being equal in all modules, increases with increasing diameter. As a result, each module 25 is designed to have a desirable ratio of its lift force versus the module. The three approximate, exemplary dimensions of modules 25 noted hereinabove yield a lift force larger than their weight, on the order of hundreds or thousands of kilograms. Calculations of all the above-mentioned variables follow hereinbelow.

Figure 3:
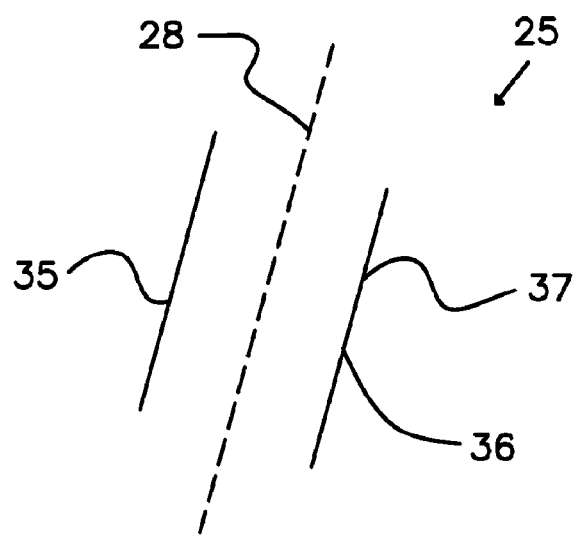
FIG. 3 is a schematic lateral cross-sectional view of one module of the integrated pipeline of FIG. 1.

Reference is now made to FIG. 3, which is a schematic lateral cross-sectional view of module 25 of pipeline 10 of FIGS. 1A and 1B. The increase of the diameter and the decrease of the wall thickness of module 25 are calculated with independent to the inclination angle of pipeline 10 during its operation. Calculations for module diameter and wall thickness assume the inclination angle is zero, meaning pipeline 10 is standing normal to the ground. Therefore points 35 and 36 are of the same thickness, and not points 35 and 37. The assumption of no inclination angle does not alter the balance of the weight and lift force acting on each module 25, since it is a function of height and not inclination angle.

Modules 25 may be attached to each other along their perimeters with steel cables. Alternatively or optionally, an embodiment of the invention includes attaching modules rigidly, with screws, rivets, or by welding. A rigid connection method yields one fixed pipeline unit. Independent of the connection method, the overall length/height of the pipeline 10 is typically enough to that the top of the pipeline extends into the jet stream.

In each attachment between modules 25, there are typically a number of openings (not shown in the figures) below folded bottom shell 33, which are big enough to allow ingress of personnel and/or necessary equipment to perform repairs in the lower part of the module, which is positioned on top seal 32 of the module below. The openings also allow ambient air to enter the module 25, thereby producing a different lift force in each module 25, as the air at different altitudes has a different density.

Fixed attachment of modules 25 also affords protection to top seal 32 of each module from objects blown by the wind, by chance or intentionally, since except for the openings noted hereinabove, the top seal is positioned completely within the space of the module above it.

Exemplary Approximate Calculations and Formulae

Approximate calculations are shown below of the weight and lift force of the hydrogen within each module 25. For these calculations, it will be assumed that hydrogen is used in modules 25 and that safety conditions allow the use of hydrogen. It should be noted that other buoyant gases such as helium or mixtures of such gases may be used.

Lift Force:

The weight of a liter of air at sea level is about 1.3 gr. Most of the air consists of nitrogen; molecular weight 28. Because of the presence of oxygen, air actually has a greater molecular weight. Water vapor and traces of additional substances do not alter the weight considerably.

The molecular weight of hydrogen is about 2, therefore the density of hydrogen is 1/14 compared to that of nitrogen at similar conditions. Since air has a molecular weight larger than nitrogen, hydrogen weighs even less than 1/14 of air at sea-level pressure and ambient temperatures. If helium was used, the density ratio is approximately 2/14, since the helium molecule, weighs about 4 atomic units. Subtracting the weight of hydrogen (or that of helium) from the weight of ambient air, results in a difference is about 1.1 to 1.2 g/liter. Using an approximate difference of about 1 g/liter, the result is that the lift force for each liter of module volume, at sea level is about 1 g, which means a lift of 1 kg per $m^3$ of pipeline volume. The air volume in a meter of pipeline length in the lower part of the lowest module (which we will assume is at sea-level) is $\pi(178)^2$, or 99,551 $m^3$, taking the example of the pipeline having a base diameter of 356 m. This means that the lift force, acting from the volume of the lower part of this module is 99.55 tons/meter. Typically, the diameter of the modules is designed to increase with the altitude so the lift force for each meter of module height will be the same at each altitude. With a module length of 180 m, the total lift force of the module is about 17,919 tons. The hydrogen pressure at the bottom of each module 25 is equal to the ambient air pressure outside the module, evaluated at the altitude of the bottom of the module. Pressure within module 25 acts against the module walls and against rounded top seal 32, since the mass of ambient air evaluated at similar altitudes, from the bottom to the top of a given module is larger than the mass of hydrogen evaluated at similar altitudes.

The weight of a meter of steel pipe length is therefore 35,600 $cm^2 \cdot \pi \cdot 100$ $cm \cdot \rho g/cm3$; $= \pi \cdot 3,560,000$ $cm^3 \cdot 7.8$ $g/cm^3 = 87.2$ tons. Thus, the weight of the entire module 25 having a height of 180 m, is about 15,700 tons. The intersection of the surface of bottom shell 33 and top seal 32 of adjoining modules 25, which actually holds the module in the air, due to the gas pressure under it, is $356,000\pi$ $mm^2$ and it can hold a weight of $356000 \cdot \pi$ (30) kg, which equals 33,552 tons, which is greater than the module's weight, hanging from this lower part of the shell. The weight of the top seal 32, assuming it is shaped as a hemisphere, having a surface area of $2\pi r^2$ and a thickness of 1 mm is: $2 \cdot \pi(178)^2 \cdot 10^4$ $cm2 \cdot (0.1)$ $cm \cdot (7.8)$ g/cm3, or 1,552.8 tons.

As a result, the total weight is about 17,256 tons, or 663 tons less than the module lift force. The weight and the lift force are balanced when adding additional items such as: additional systems attached to modules 25; welding or bolts for attachment of the module; rings at the bottom and the top of the module used to attach the bolts (should the pipes be attached by bolts); and steel cables and whatever is attached to them (should the pipes be attached by cables). If additional weight yields a total module weight greater than the lift force, there is a need to lengthen modules 25 somewhat, since each meter of module length (i.e. height) yields a margin of 12.315 tons lift. The lift force of the hydrogen in the top seal 32 is not included, since any top seal in the embodiment of the invention is inserted within the module above.

The elasticity that each wall of module perimeter in a module at a diameter of 356 m can bear, according to a calculation of 30 $kg/mm^2$, is $\pi(356)(1000)(10)(30)$; or 335,522 tons; and that is the elasticity that any module 25 in pipeline 10 can bear, since its section's area is equal to the section's area of the lower module.

This lift ability remains unused, since in order to prevent an excessive compression force on the module wall, each module carries only itself and is at a neutral balance at each height. A diameter of 2 m of a lower module will give permitted elasticity at $\pi(1005^2-995^2)(30)$, or 1,885 tons.

At a diameter of 502 m, the lower module yields permitted elasticity at $\pi(502)(10^4)(30)$, or 473,123 tons. Pipeline 10 may be fixed to the ground with steel chains firmly inserted in cement pilings.

Figure 4:
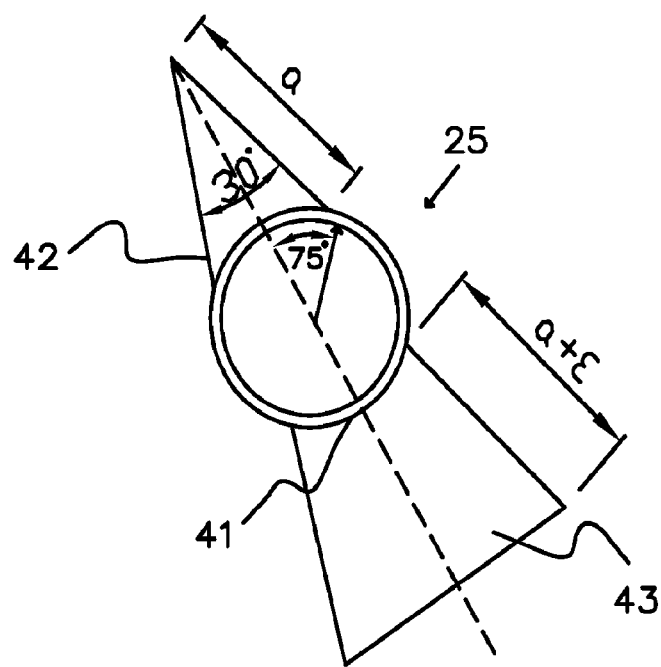
FIG. 4 is a schematic cross sectional view of the module with an aerodynamic 5 sail attached, according to an embodiment of the current invention.

FIG. 4 shows a schematic cross sectional view of module 25 with a pointed aerodynamic sail 42 and a trailing aerodynamic sail 43 attached, according to an embodiment of the current invention. To minimize the wind pressure on pipeline 10, it is possible to attach to each module 25 the pointed and trailing sails 42 and 43, made of a light substance, such as a coated material (to make it resistant), which is stretched on a light frame (as aluminum) and which turns freely. Sails 42 and 43 may turn freely if they are fixed on two rings (not shown in the figure) that are placed close to the top and the bottom of each module 25. The rings are designed to slide on two fitted rings made of self-greasing plastic material, and which are attached to each module 25. In FIG. 4, "a" is any desirable measurement, e is any small number larger than 0. It is advisable that $\epsilon$ be at least $\frac{1}{10}$ of "a".

In aerodynamic sails fabricated in this way, the pointed sail arrow is always directed towards the wind. The wind impacts the slanted edge of pointed sail 42. An inclination angle is 15° to the direction of the wind. The compressive power of the wind, impacting a wall at such an inclination, compared to the wind's power when it impacts a wall normal to the direction of the wind is $\sin^2 15° = 0.067$. This value is multiplied by the base surface of the triangle, formed by pointed sail 42, which is $2r/(\sin 75°)(a+a+\epsilon)/a$, where l=module length and r=module diameter.

It is possible that it is sufficient to position sails with such an inclination angle only in the higher portion of pipeline 10, where especially strong wind blows. In other lower parts of pipeline 10 it is possible to utilize aerodynamic sails having an inclination angle larger than 15°, and/or to dispense entirely with aerodynamic sails for some parts of the pipeline.

In very long (tall) modules 25, it is possible that it is best to position two or more separate aerodynamic sails, one on top of the other, so that if the direction of the wind at the different altitudes of the pipe are not exactly the same, the efficiency of the aerodynamic sails will not decrease. (In extreme cases, sails could break because of pressure differences of the wind in different directions).

Figure 5:
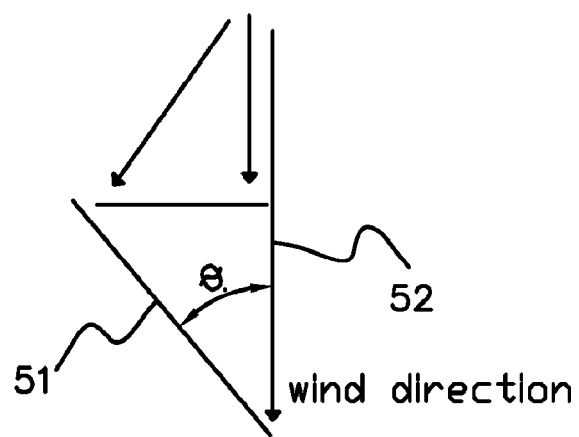
FIG. 5 is a diagram of vectors showing an angle of inclination of the aerodynamic sail versus the wind direction.

FIG. 5 shows a vector diagram showing an angle of inclination of aerodynamic sails 51 versus a wind direction 52. The detail of obtaining the result $\sin 2\theta$, which is the ratio between the wind's force on the aerodynamic sails, with an inclination angle of $\theta$, in proportion to the wind's direction and the wind's force on the aerodynamic sails impacting exactly normal to the wind's direction is indicated in the figure.

Calling F the total force acting on 1 $m^2$ of a surface normal to the wind, the force of the wind acting on the aerodynamic sails, with an inclination angle of θ to the wind, is F sin θ. The projection of F sin θ on the wind's direction is F sin²θ.

Pressure on the Top Seal from Inside, and the Stress in the Seal

An approximate calculation follows of the pressure on top seal 32 and the stress acting in it. It is found that that stresses are acceptable. An initial calculation is performed to find the order of magnitude, followed by a more precise calculation. If the length of all the modules 25 in pipeline 10 were equal, the difference of the pressures at the top of modules between the outer side and the inner side of the top seal 32 is highest in the lower module. This is because (a) the pressure in the inner part on every given point is equal to the air pressure at the bottom of the pipe, minus the weight of the hydrogen head beneath the module 25 up to the height of the top seal 32 at a given point within the module surface; and (b) the proportions of the pressures between positions located at fixed height differences are equal; and close to the ground, the air pressure is the highest. As an extreme example, using the length of the biggest module, 502 m, the pressure for the central part of top seal 32, is calculated. The ambient pressure outside the center of top seal 32 is that of atmospheric pressure at a height of 500 m above sea level. For a height difference of 500 m, the pressure ratio between the two altitudes is about 0.94. Therefore if at sea level the pressure is about 1000 g/cm², at height of 500 m, the ambient pressure is 940 g/cm² or 60 g/cm² less. The pressure of the hydrogen head is about 1/14 of 60 g/cm² (if helium this would be 2/14) or 4.29 g/cm² (for helium: 8.6 g/cm²). Therefore, the inner pressure in the upper part of the module is 995.71 g/cm² (for helium: 991.4 g/cm²), and the pressure differences between ambient and within the module is about 55.7 g/cm² (for helium: 51.4 g/cm²).

Stress in the top seal can be calculated by the formula $\sigma = r \cdot p / 2t$ (or, where $\sigma$=stress in the top seal in kg/cm², r=radius of the ball in meters, p=the pressure in kg/cm², t=the thickness of the top seal in meters. Expressed alternately, the radius can be calculated by the formula $r = 2t\sigma/p$.

If top seal 32 is fabricated from steel, which is strong enough to hold a maximum stress of $\sigma$=3000 kg/cm², the radius is $2(10^{-3})(3000)/0.05657$ or 107.7 m.

It therefore appears that a top seal, with a thickness of 1 mm, is limited in the lowest module to a diameter of 215 m. In upper modules, the pressure difference between the inner side and the outer side of the module wall will be smaller and will decrease along with the altitude. As the pressure difference of 55.7 g/cm² exists only at the highest point of top seal 32, it seems a more rigorous calculation to find the allowable maximal radius for the top seal is required.

Figure 6:
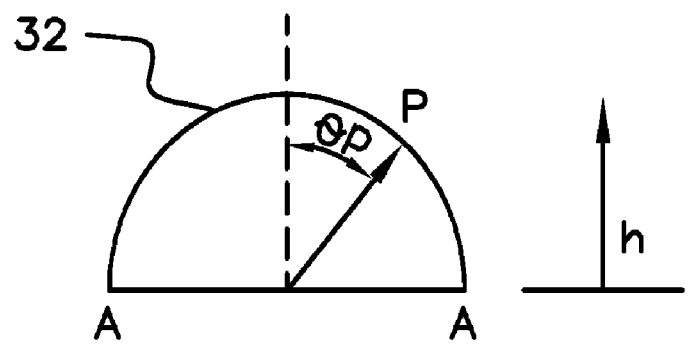
FIG. 6 is a partial side cross-sectional view of a top seal and its seal with the module (not shown), in accordance with an embodiment of the current invention.

FIG. 6 shows a partial side cross-sectional view of top seal 32 and its seal with the module (not shown), in accordance with an embodiment of the invention. The pressure at each point on the top shell is calculated below the pressure 5 in each point is according to the point's height, meaning according to the distance between the point on the semi-circle perimeter, in and the point beneath it on the line A-A in the figure. This distance is $r \cdot \cos \theta_p$. Assuming that the temperature is constant along the entire module 25, the pressure for each point on the perimeter, compatible to the radius at an angle $\theta = \theta_p$ is:

$$1.3^3_{(KgF/m)} \int_0^{r\cos\theta} e^{\left(-\frac{mgh}{KT}\right)} dh - (1.3)(1/14) \int_0^{r\cos\theta} e^{\left(-\frac{mgh}{14KT}\right)} dh$$

where m=the nitrogen molecular mass (approximately an average molecular mass of air), h=the height from the A-A line, g=acceleration due to gravity, K is the Boltzmann constant and T is the temperature in Kelvin.

$$= [-(1.3)KT/(9.8)m]e^{\frac{-9.8mh}{KT}}]_0^{r\cos\theta} -$$

$$\left[-1.3\left(\frac{1}{14}\right)\frac{KT}{\left(\frac{1}{14}\right)9.8m} \cdot e^{-\left(\frac{1}{14}\right)\frac{9.8mh}{KT}}\right]_0^{r\cos\theta}$$

$$= \frac{1.3KT}{9.8m}\left(-e^{\frac{-9.8mr\cos\theta}{KT}} + e^{-\left(\frac{1}{14}\right)\frac{9.8mr\cos\theta}{KT}}\right) = F$$

This is the difference between the air and hydrogen heads mass of an intersection of 1 m², for a head whose upper edge in the top seal hemisphere reaches to a point at the angle θ. This is therefore the lift force for 1 m² inside the hemisphere volume. This is the value at one point for this angle θ.

An integral should be calculated on each value as such, for every shell's belt that is parallel to the bottom of the shell, a belt, which is wholly at the angle θ. This means that an integral should be calculated by $$\int_0^{2\pi} F \cdot r \sin\theta d\varphi,$$

or 2πF sin θ.

Finally, for each result obtained, an integral is calculated from 0 to r(π/2), for the entire hemisphere (which is for all the δ angles).

Obtaining $$T_0 \equiv 2\pi r \int_0^{\frac{\pi}{2}} F \sin\theta \cdot r \, d\theta \equiv$$

the total lift force on the hemisphere.

$$= 2\pi r^2 \frac{1.3KT}{9.8m} \int_0^{\frac{\pi}{2}} \left(-e^{\frac{-9.8mr\cos\theta}{KT}} + e^{-\left(\frac{m}{14}\right)\frac{9.8r\cos\theta}{KT}}\right) \sin\theta d\theta =$$

defining:

$$x = \cos\theta \Rightarrow \frac{dx}{d\theta} = -\sin\theta \Rightarrow d\theta = -\frac{dx}{\sin\theta}$$

yields:

$$= 2\pi r^2 \frac{1.3KT}{9.8m} \int_0^1 -e^{\frac{-9.8mrx}{KT}} + e^{-\frac{m}{14}\frac{9.8rx}{KT}} dx =$$

Further defining:

$$\alpha \equiv \frac{9.8mr}{KT}, \beta \equiv \frac{\frac{m}{14}9.8r}{KT}, c \equiv \frac{2\pi r^2(1.3)KT}{9.8m}$$

yields:

$$= c\int_0^1 -e^{\alpha x} + e^{-\beta x}\,dx = \frac{c}{\alpha}e^{-\alpha x}\Big|_0^1 - \frac{c}{\beta}e^{-\beta x}\Big|_0^1 = \frac{c}{\alpha}(e^{-\alpha}-1) - \frac{c}{\beta}(e^{-\beta}-1) =$$

$$\frac{2.6\pi rK^2T^2}{(9.8)^2 m^2}\left(e^{\frac{-9.8mr}{KT}}-1\right) - \frac{(14)2.6\pi rK^2T^2}{(9.8)^2 m^2}\cdot\left(e^{\frac{-9.8mr}{14KT}}-1\right) =$$

Setting m=28 (1.6605)×10$^{-27}$ kg=4.6495×10$^{-26}$ kg; T=291 K (average temperature of the lowest module); K (a constant, not to be confused with "K—Kelvin")=1.38062×10$^{-23}$ J/K; and r=291 m.

To determine the width of the round shell, the following equation is evaluated. The formula serves to determine a minimal width is $T_o=2\pi r\sigma d$ at the seam of top seal 32 and the module, where "d" is the width of the top seal. Solving for d, $$d=T_0/[2\pi r(3000)]=5942.94\cdot 10^4/[2\pi(251\cdot 100)(3000)]= 1.256\cdot 10^{-1}\text{ cm}=1{,}256\text{ mm}$$

Due to the force of pressure upon it, the top seal hemisphere tends to have a paraboloid shape. However, since pressure differences at the different places are not large, the spherical form is almost approximately retained.

Solving in general for $T_0$ to find the required d for all cases, we obtain:

$$d=2.6\pi r K^2T^2/(9.8)^2 m^2\cdot 2\pi r\cdot 3000\cdot 10^4\cdot[(e^{-9.8\,mr/KT}-1)- 14(e^{-9.8\,mr/14\,KT}-1)]$$

Inserting the values of "T", "K", and "m":

$$= 3.3689513\left(13 + e^{-1.1341322\cdot 10^{-4}r} - 14e^{-8.1009443\cdot 10^{-6}r}\right)$$

Substituting values for r, values for d are obtained as indicated in the table hereinbelow.

| r (m) | d (mm) |
|---|---|
| 50 | 0.0499 |
| 100 | 0.198 |
| 150 | 0.4 |
| 200 | 0.796 |
| 224 | 1.0003 |
| 251 | 1.25 |
| 300 | 1.79 |
| 350 | 2.43 |

It may be seen that up to a radius of 224 m (at the given temperature) a top seal thickness of 1 mm is sufficient. Using the formulae hereinabove and calculating values for a given altitude (which infers values of T) it can be shown that a minimum thickness of the top seal 32 is 1 mm. According to this critical constraint, a maximal possible radius is determined (since, as mentioned, the radius increases with the increase of the height) for the bottom module. It is also possible to make the top seal 32 parabolic or even more curved than parabolic if required.

Calculation of a Characteristic "Cone" of the Pipeline

Figure 7:
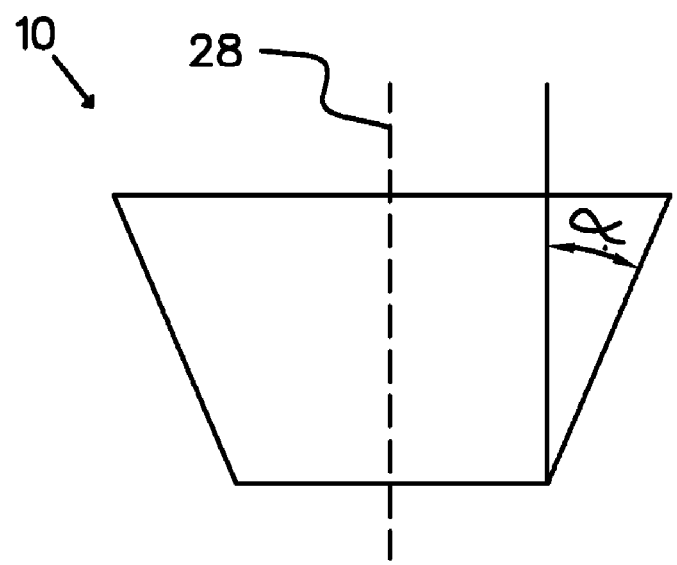
FIG. 7 is a representation of the pipeline of FIG. 1, according to an embodiment of the current invention.

FIG. 7 is a representation of pipeline 10 of FIG. 1, according to an embodiment of the current invention. As noted hereinabove, the diameter of the pipeline 10 increases with increasing altitude. The discussion below addresses a calculation of a characteristic cone shape of the pipeline, or in other words, an angle α of pipeline 10. The calculation assumes the overall pipeline inclination (i.e. inclination of axis 28, FIGS. 1 and 3) during operation of the system to be 30°. With this assumption, the pipe's length, up to 1 km height above the surface is: 1/cos 30°=2√3=1.1547.

Figure 8:
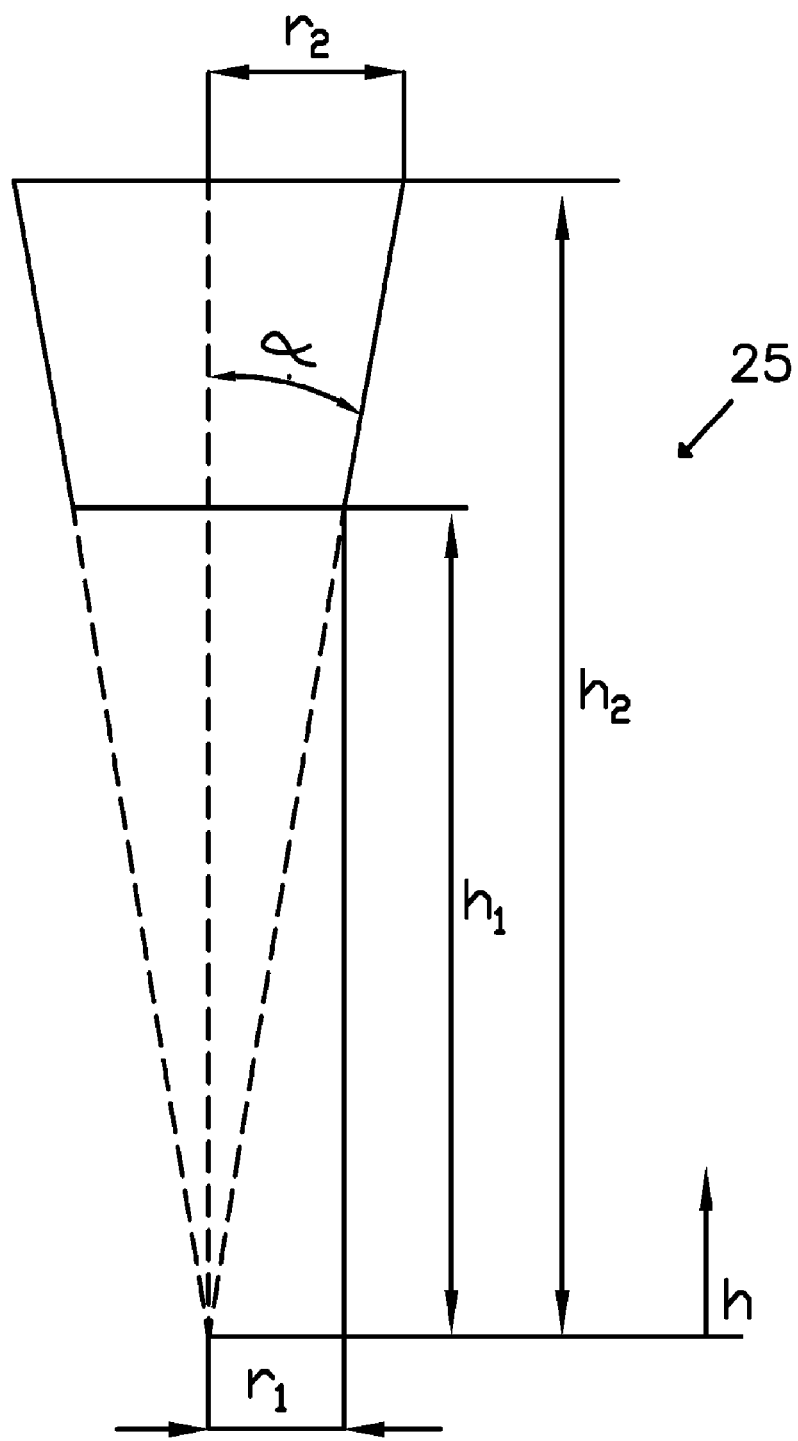
FIG. 8 is a diagram of the module illustrating various relevant radii and heights.

Reference is now made to FIG. 8, which is a diagram of module 25 showing different radii and different altitudes or heights. At the height of 1 km, the air's density is 0.9, relative to its density at sea level. A calculation follows to determine the radius $r_2$ of a cylinder whose length is 1 meter and which is located at an altitude of 1 km, so that the air's weight within a cylinder having radius $r_1$ is equal to that of air within the cylinder when it is located at sea level. In this way, it is possible to determine an equal lift force for cylinders at both locations.

Indicating: $\rho_1$ as air density at sea level; and $\rho_2$ as air density at 1 km altitude. According to the requirement:

$$\pi r_1^2\rho_1 = \pi r_2^2\rho_2$$

$$\rho_1/\rho_2 = (r_2/r_1)^2$$

$$r_2/r_1 = \sqrt{(\rho_1/\rho_2)} = \sqrt{(1/0.9)} = 1.0540926$$

The result is obtained that at a pipeline length of 1.155 km, the radius increases $0.054093\times r_1$. In this specific case, $r_1$=224 m or 0.224 km:

We obtain:

$$tg\alpha = 0.0121167/1.1547005 = 0.0104933 \Rightarrow \alpha = 0.6012°$$

Control of Pipeline/Module Pressure, Pressure Adjustment, and Repairing the System As noted hereinabove, each module 25 may have a means of directly or indirectly measuring gas pressure within it. Furthermore, embodiments of the current invention include a means for inserting or releasing gas within a module from time to time. Typically, some repairs to the system may result in cessation of system operation, while some repairs may be made during system operation. One example of a repair made while system operation continues is the release of gas from one or more modules, which can be done without disturbing system and/or module functioning. This is because the buoyant force, which extends through stretching the entire pipeline 10 and which is supplied by the upper modules and other upper components of the system (as described hereinbelow) is typically strong enough to bear additional loading and to maintain the pipeline without an excessive inclination angle, in cases where winds are not excessively strong.

An embodiment of the present invention includes small pipes or tubes attached to each or most of the modules 25 in pipeline 10 to insert and release gas. These tubes may be connected to a riser common to the bottom of the pipeline 10. It is preferable that the tubes are distributed within the perimeter of the module perimeter, so that a tearing or malfunction of the one tube in one area will not affect the others, thus endangering the system's functioning. Alternatively or optionally, because of such a risk, it is best not to attach the tubes to the system at all—rather only the tubes when necessary, separately filling the module and taking advantage of the opening to which a device for pressure measurement is attached.

Protection from Lightning

If pipeline 10 is not coated from the outside with a plastic layer, thick enough to prevent lightning conduction, there is the need to attach a cable to the pipeline. The cable must have high conductivity, greater than that of pipeline 10. The purpose of the cable is to guide away lightning strikes on pipeline 10. It should be clarified that lightning strikes are deleterious to the system. It is possible to use the energy from lightning strikes, which are removed to a different place, through the mentioned cable. Pipeline 10 may be made of steel but optionally or alternatively it may be made of composite substances, whose specific gravity is much lower than that of steel, and whose and electrical conductivity is low. One or more conductive cables are in close proximity to pipeline 10, supported divided symmetrically around the pipeline and attached to the pipeline by an insulated substance.

An additional possibility for lightning protection, using a conductive film, is apparent with reference to the overall conical shape of the pipeline as shown in FIG. 7 and FIG. 2, for example. A conical shaped film, starting at the base of pipeline 10 and extending upwards to a given altitude "h", a film of a circled intersection is attached to the upper edge of module 25. Because of the gas's low specific gravity, this shape remains almost circular and does not assume a parabolic shape.

Figure 9:
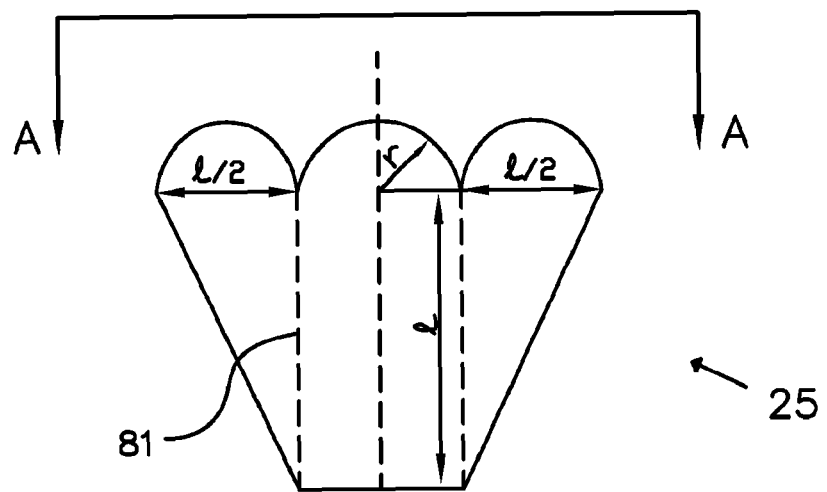
FIGS. 9 and 10 are, respectively, a cross-sectional view and a top view of a module, in accordance with an embodiment of the present invention.
Figure 10:
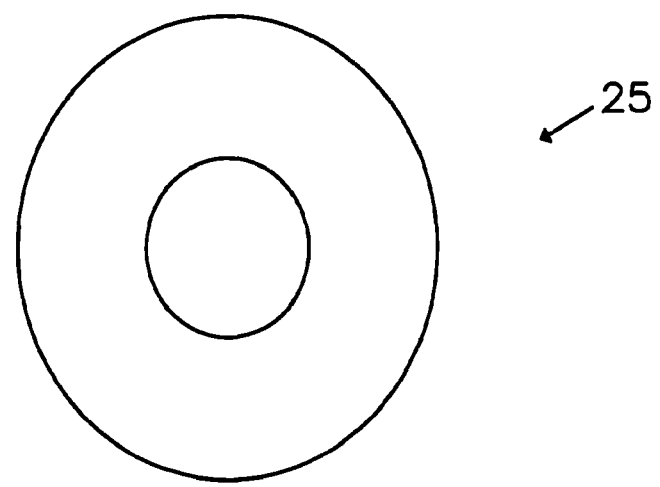
Figure 11:
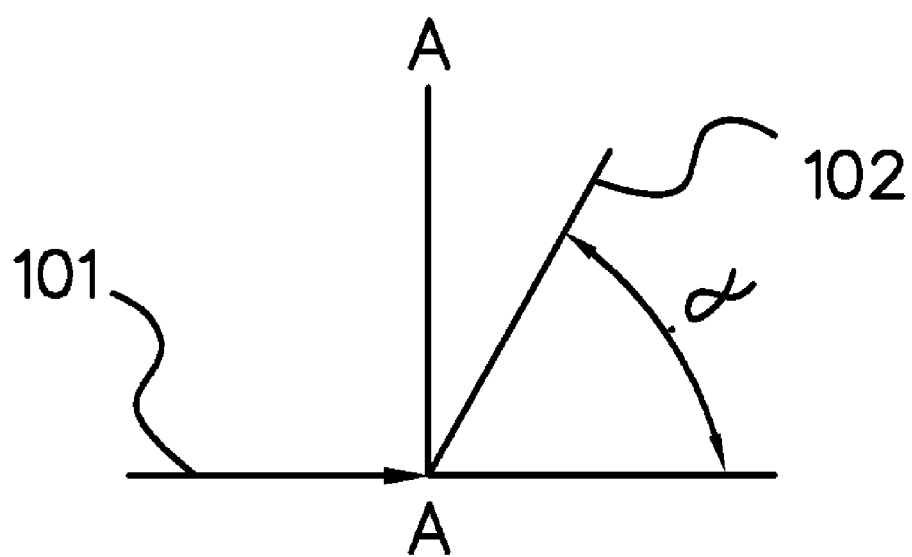
FIG. 11 is a schematic diagram of a wind incident on one of the aerodynamic sails, in accordance with an embodiment of the present invention.

Reference is now made to FIGS. 9 and 10, which are, respectively, a cross sectional view and a top view A-A of module 25 shown in FIG. 10, and to FIG. 11, which is a schematic diagram of a wind 101 incident on a sail 102, in accordance with an embodiment of the invention. Each module 25 is blocked at its bottom part with a flexible and folded barrier, which prevents the passage of the gases, as described previously. The shape of module 25 in current figures could be made also without sails to reduce wind pressure, since its shape minimizes the wind pressure on the module. The pressure of the wind on a plain surface 102, inclined at an angle α, towards the wind's direction is as mentioned hereinabove, relative to $\sin^2 \alpha$. If the surface, at some point, inclines also at angle β (not indicated in the figure because the angle is out of the plane of the page) around the axis denoted A-A in FIG. 11, then the wind's pressure on the surface will be relative to $\sin^2 \alpha \sin^2 \beta$.

General Calculation of the Module Sizes

For each module 25 to float in the air, the lift force acting on the module due to the specific gravity difference between hydrogen (or helium) and air should be greater than the empty module weight. For a module 25 such as that shown in FIG. 2 hereinabove, the "l" values (module length in meters) and "r" values (module diameter, in meters) are determined.

There is a need to examine the diameter, should there be a demand to choose a largest possible diameter, according to the most constrained module section along the pipeline 10, for which a top seal having a thickness of 1 mm has been shown to be sufficient. The module wall thickness and top shell have been chosen to be 10 mm and 1 mm, respectively. Of course, alternative values may be chose using the equation hereinbelow. Assuming the module material has an exemplary density of 8 g/cm$^3$ (although the material and specific gravity may be varied). The following equation is applicable:

$$2\pi r l(10{,}000)(1)(8) + 2\pi r^2(10{,}000)(0.1)(8) - \pi r^2 l/(1000) < 0$$

where the values "10,000" convert square meters to square centimeters; the value "1" is a first thickness; the value "8" is the density; the value "0.1" is a second thickness; and the term "$\pi r^2 l$" computes volume.

The expression on the left side of the equation gives the balanced force in grams, which operates on each module 25. The result in kg is:

$$\pi(160 r \cdot l + 16 r^2 - r^2 \cdot l) < 0 \text{ Kg}$$

The weight of additional subsystems/devices, attached to the module 25, has not been included here, since their weight is negligible and since their weight is compensated by an additional 100 g per m$^3$, neglected in calculating the lift force. The hydrogen lift force of the rounded top seal has also not been included, since the hydrogen's volume is included in the hydrogen volume of a module above the module under consideration (and it is only necessary to consider this volume only in the calculation of the upper part of the pipeline).

Additional weight and the lift force to be taken into consideration have been described hereinabove with reference to FIG. 7.

The cone-shaped module weight (the thickness of all the additional top seals being 1 mm) may be expressed by:

$$(0.1)(8)(10) \int_{h1}^{h2} 2\pi h t g \alpha \, dh / \cos\alpha =$$

$$(8) 2\pi (tg\alpha / \cos\alpha) \int_{h1}^{h2} h \, dh = 16\pi \frac{tg\alpha}{\cos\alpha} \left( \frac{h_2^2}{2} - \frac{h_1^2}{2} \right) =$$

$$8\pi \frac{tg\alpha}{\cos\alpha} (h_2 + h_1)(h_2 - h_1) = \frac{8\pi}{\cos\alpha} (r_2 + r_1)(h_2 - h_1) =$$

$$8\pi (r_2 + r_1) \sqrt{(h_2 - h_1)^2 + (r_2 - r_1)^2} = \sqrt{5} \, 8\pi \left( r l + \frac{l^2}{4} \right) Kg$$

The factor 0.1 at the beginning of the formula is the cone-shaped module thickness in cm. The factor 8 is the approximate weight of a cubic centimeter of the substance (steel), in grams. The factor 10 is what is left of the product in (100)$^2$ because "h" and "dh" are taken in meters and the division in 1000 is performed to obtain a weight result in kg and not in grams).

The weight of the top seal 32 with the half circular intersection is (shown here the final formula directly, without derivation):

$$\frac{\pi^2}{2} \left( 2r + \frac{l}{2} \right) \left( \frac{l}{2} \right) \cdot 10000 \cdot (0.1) \cdot 8 \frac{1}{1000} = 4\pi^2 \left( 2r + \frac{l}{2} \right) \frac{l}{2} Kg$$

The volume of the cone-shaped part is (in m$^3$):

$$V = \frac{1}{3} \pi l \left[ \left( r + \frac{l}{2} \right)^2 + r^2 + r \left( r + \frac{l}{2} \right) \right] = \pi l \left( r^2 + r l + \frac{l^2}{12} \right)$$

The volume of the half-circular part in m$^3$ is:

$$V = \frac{\pi^2}{8} \left( 2r + \frac{l}{2} \right) \left( \frac{l}{2} \right)^2 = \frac{\pi^2}{16} \left( r l^2 + \frac{l^3}{4} \right)$$

The volume of the pipe existing inside the cone is: $2\pi r l/(0.01)$ m$^2$ and it is subtracted from the cone's volume. It is not neglected, in spite of its small size. The lift force on each m3 of volume is about 1 kg, therefore the lift force for each pipeline section is:

$$F_{lift} = \pi l \left( r^2 + \frac{r l}{2} + \frac{l^2}{12} \right) + \frac{\pi^2}{16} \left( r l^2 + \frac{l^3}{4} \right) - 2\pi r l (0.01) Kg$$

The equation which must be satisfied for each module/each section of the pipeline 10, for it to float in the air is:

$$\pi \left[ \begin{array}{l} \sqrt{5} \cdot 8\left(rl + \dfrac{l^2}{4}\right) + 4\pi\left(2r + \dfrac{l}{2}\right)\dfrac{l}{2} + 160rl + \\ 16r^2 - l\left(r^2 + \dfrac{rl}{2} + \dfrac{l^2}{12}\right) - \dfrac{\pi}{16}\left(rl^2 + \dfrac{l^3}{4}\right) + 2rl(0.01) \end{array} \right] < 0Kg$$

Combining terms, the following is obtained:

$$\pi \left[ \begin{array}{l} rl(\sqrt{5} \cdot 8 + 4\pi + 160 + 0.02) + l^2(2\sqrt{5} + \pi) + \\ r^2(16 - l) - rl^2\left(\dfrac{1}{2} + \dfrac{\pi}{16}\right) - \dfrac{l^3}{4}\left(\dfrac{1}{3} + \dfrac{\pi}{16}\right) \end{array} \right] < 0$$

As previously noted, calculations made regarding the lower module are applicable for other modules, since the proportion between the module weight and the lift force on it due to its volume is equal to that of the lower module. However, this is true only related to the body of the module and not regarding all the top seals, since their thickness stays constant: 1 mm, and the increase of top seal volume increases the seal weight. This problem is solved by making the seals of the modules above the lower module, partially or fully, from composite substances, having a specific gravity of ¼ or less than that of steel. (For example, an exemplary composite material having a specific gravity of 1.65 g/cm$^3$ is applicable). A table of computer results, regarding both module types (steel and composite material) is presented hereinbelow, giving a clear idea of possible diameter and length values of lower modules.

Figure 12:
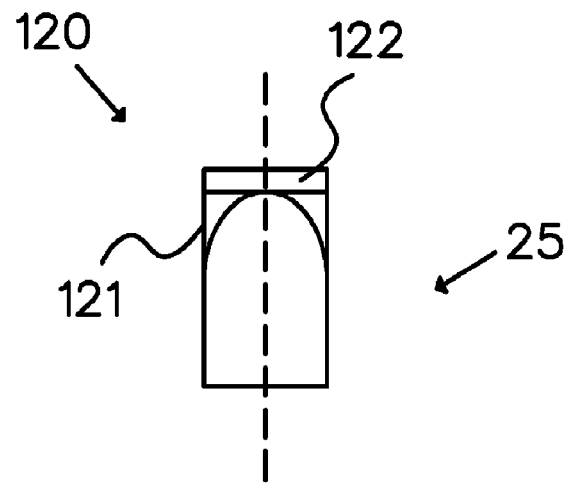
FIG. 12 is a schematic side view of the module, a continuing lateral wall, and a bearing, in accordance with an embodiment of the current invention.

Reference is now made to FIG. 12, which is a schematic side view of an upper module 120, a continuing lateral wall 121, and a bearing 122, in accordance with an embodiment of the current invention. Upper module 120 should be made in a manner that no top seal moves from its upper edge in a way that offers resistance to a wind blowing towards other parts of the system, such as the sail line 20. In one embodiment, upper module 120 is fabricated basically similarly to other modules of the system only that in the upper module, continuing lateral wall 121 is extended to the maximum height of the top seal. On the upper portion of continuing lateral wall 121, its wall thickness is somewhat increased and bearing 122 is attached above it.

To increase operational life of components, a plastic substance is used, one of a self-greasing character, to minimize friction. (If possible, it is advisable to make all parts which make up the bearing and sail line 20 from composite substances, of low specific gravity). A number of poles 24, having an aerodynamic shaped, extend from the part of the bearing adjacent to the highest module of pipeline 10, in such a way that the poles do not significantly offer resistance to the wind. The poles 24 have a total cross sectional area equal to the cross sectional area each module in the pipeline 10. The sail line 20 is connected to these poles 24 described hereinabove.

Pipeline 10 has additional systems attached to it, which will be mentioned hereinbelow, as part of the explanation of the system's operation. In the largest variation of pipeline 10, whose diameter at the base is 502 m, and the diameter at the top is approximately 1004 m, it is possible to make the aerodynamic poles 24, as mentioned above, at a length of 502 m. The upper edges of these poles 24 are attached to huge closed shells 130 (their exemplary thickness being 1 mm) having a cone or flat shape, but having an aerodynamic edge, and filled with hydrogen. The purpose of huge closed shells 130 is to stretch pipeline 10 upwards and prevent it from inclining at a large angle due to the wind pressure on the sails positioned on sail line 20.

Attachment of these shells to pipeline 10 could be by means of many steel wires, so that the maximal force upwards, which can pass through the wires, is equal to the maximal force upwards which can pass through any module of the pipeline when it is inclined. The exact calculation of the shell volume is presented hereinbelow following calculation of the wind's pressure magnitude upon the sail line.

Figure 13:
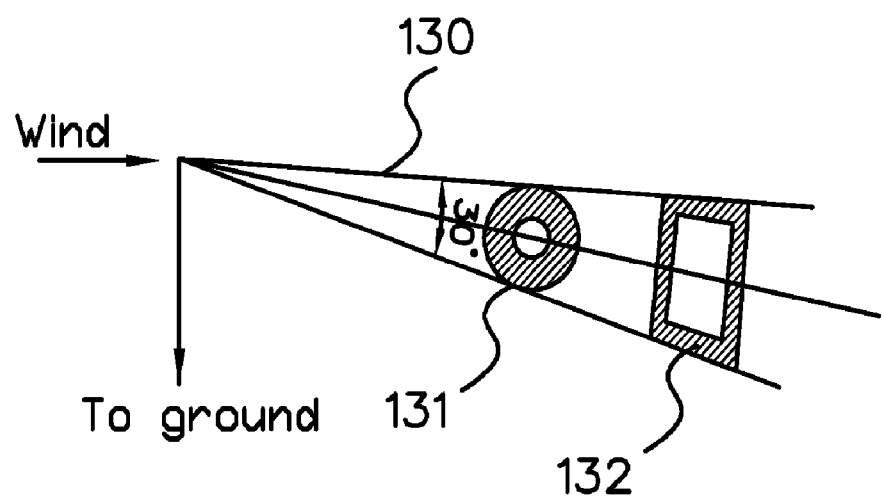
FIG. 13 is a schematic cross sectional view of a closed shell of the sail line, in accordance with an embodiment of the current invention.

Reference is now made to FIG. 13, which is a schematic cross sectional view of a closed shell 130 of sail line 20, according to an embodiment of the invention.

Closed shells 130 have an angular "sharp" edge facing the wind, as indicated in the figure. The angular value of 30 degrees is not mandatory, however a more acute angle will reduce wind pressure on closed shells 130, while a less acute angle will increase wind pressure. Closed shells 130 are attached to the aerodynamic poles 24, so that they do not contact nor collide with each other. A single closed shell 130 is fabricated if it impossible to maintain this requirement. A frame is attached to the aerodynamic poles 24; the poles being placed above the bearing 122 described hereinabove. The frame is a few kilometers long and at the same height as the aerodynamic poles 24. The exact dimensions of the frame are determined according to the wind pressure, which determines the degree of stretching necessary by closed shells 130 for pipeline 10 not to incline more than has been predetermined.

Closed shells, filled with hydrogen, are also attached to the frame. The closed shells may be attached, for instance, at their upper side along their length and along their two sides. The closed shells bear the weight of the frame and other equipment attached to the frame.

Chains carrying the sails are connected to the frame by bearings. The sails, each shaped as a rectangle, are directed so that the wind impacts upon and moves them. The sails are constantly in motion with the entire sail system moving in a cyclic track. The sails are attached in a way so that when they move in the direction of the wind, they are maintained normal to the wind and when they move back against the wind they are maintained parallel to the wind. Additional chains are used to direct and further support the sails.

In some embodiments, the sail rotational speed is controlled by a system of connectors, cogs and regulators, including, but not limited to a controller/processor 71 (schematically shown in FIG. 20) commanding and controlling generators, batteries, motors, and additional mechanical systems known in the art. In general, the purpose of controlling the sail rotation speed is to control the sail velocity, in some embodiments, as close as possible to ⅓ of the wind's velocity.

One or more measurement devices to measure wind velocity measure are placed on the sail and the device/devices are connected to the system regulating the sail velocity. Additional velocity sensors may be located along the sails' height to provide additional data to a processor, which can better determine a weighted average or other mathematical value to more accurately represent wind velocity.

Sensors are distributed along the upper kilometers of pipeline 10 to measure wind energy. The sensors supply data to a water pump to inject or remove water from special tanks placed at the top of modules 25 in pipeline 10. The tanks are attached by small tubes to the ground. The tubes and tanks are provided to add or reduce ballast in the upper part of pipeline 10, thus determining the weighed force stretching the pipeline upwards and thus determining the pipeline's angle of inclination. In turn the exact height of sail line 20 is determined, since a horizontal force is active on pipeline 10, supplied by the wind's pressure on the sails. The inclination may also be controlled with the aid of one or more additional sail having a variable angle, which is changed according to the wind energy-measured data.

Sail line 20 is therefore maintained at an altitude having maximal wind energy is maximal. Ballast and pump operation are integrated to maintain maximal wind energy but also to take into account less frequent ballast and pump operation so as not to activate the engine, which could infuse water too frequently in an attempt to changes altitude due to negligible wind speed differences.

The attachment between sail line 20 and pipeline 10 is by an axle allowing a variable angle between the sail line and the pipeline, to prevent a pressing force on upper module 120 of the pipeline.

It should also be noted, that the cooling of the electricity producing generators 22 will be a straightforward matter, since the temperature at the high altitude in which jet streams are found is about −50° C. Channeling winds having such low temperatures should easily effectively cool generators 22.

Calculation of the Required Sail Movement Speed

The following discussion shows that, the optimal sail rotational velocity may be about ⅓ of the wind speed. The calculation of the sail velocity in the wind's direction, which will enable the highest possible power to be calculated, is determined by the following equation:

$$P = \frac{w}{t} = \frac{\overline{F} \cdot \overline{X}}{t} = \overline{F} \cdot \overline{v}_1$$

in which, P=power in Watts; W=work in Joules; T=time in seconds; F=pushing force in Newtons; X=movement along which the force activates in the movement's direction, in meters (the directions are fixed; therefore there is no need to sum the sections) and v1=the speed of the sails 51 in meters per second.

The force "F" is calculated by the air's molecules' change of momentum at the moment of impact/impingement. At every second, a mass quantity M, equal to $\rho(v-v_1)$ impacts upon one square meter of the sail 51, which is positioned normal to the wind. (v=wind's speed in m/sec, $\rho$=air density in kg/m$^3$). The momentum of this mass quantity in the sail system is $M(v-v_1) = \rho(v-v_1)^2$.

The assumption is that the impact/impingement is elastic, since that is the case at a very close approximation. Therefore, the final momentum of this mass after the wind impinges the sail 51 is equal in size and opposite in direction to the initial momentum. Since the quantity $\rho(v-v_1)^2$ is the momentum for every second per m$^2$, the result is that at each second, the mass with this momentum receives a momentum in the opposite direction. Therefore, the difference of momentum that the sail causes to the air molecules in the sail system (and all the sails move at the same speed) is $2\rho(v-v_1)^2$.

This is the magnitude of the force being activated on a m$^2$ of the sail 51 at every moment. The same force is active on the sail 51 also in the earth's system. The sail's speed at that moment is $v_1$. Therefore, the power of the wind for each m$^2$ of the sail 51 is $P=2\rho(v-v_1)^2(v_1)$. Differentiating to determine what $v_1$ yields maximal power:

$$\frac{\partial P}{\partial v_1} = 2\rho(v-v_1)^2 + 4\rho(v-v_1)(-1)v_1 = 0$$

The solution is:

$$(v-v_1)(v-3v_1) = 0$$

$$v_1 = \frac{v}{3}$$

The result is that in order to obtain maximal power, the sail's speed should be a third of the wind's instantaneous speed. Finding the magnitude of this maximal power, substitute for "p" in the above equation:

$$P_{max} = 2\rho\left(\frac{2}{3}v\right)^2 \frac{v}{3} = \frac{8}{27}\rho v^3$$

Determining which part of the above equation represents the wind's power:

$$P_{wind} = \frac{1}{2}mv^2 = \frac{1}{2}\rho v^3$$

$$\frac{P_{max}}{P_{wind}} = \frac{\frac{8}{27}\rho v^3}{\frac{1}{2}\rho v^3} = \frac{16}{27} = 0.59259 \approx 0.6$$

This is the known result regarding maximum useable wind energy resulting from other calculations.

There is a need to calculate the wind's pressure on the sails 51, the amount of energy per m$^2$ of sail produced by the wind, and to show the manner in which the system works. First, the air density at a given height relative to the air density at sea level is calculated. Density is the number of molecules per volume unit times the average weight of a molecule or the number of moles per volume unit times the average weight of the mole. According to the ideal gas law formula:

$$\frac{PV}{T} = nR$$

Where n=the number of moles (a constant number is used for the calculation); R is the gas law constant; the result is:

$$\frac{P_1 V_1}{T_2} = \frac{P_2 V_2}{T_2} \Rightarrow \frac{V_1}{V_2} = \frac{P_2 T_2}{P_1 T_2}$$

where subscript 1 indicates sea level; and subscript 2 indicates high altitude. The result is:

$$\frac{\rho_2 \text{ at great height}}{\rho_1 \text{ at sea surface height}} = \frac{mgN\frac{n}{V_2}}{mgN\frac{n}{V_1}}$$

$$= \frac{V_1}{V_2}$$

$$= \frac{P_2 T_1}{P_1 T_2}$$

-continued $$= \frac{(200_{mb})(273° \text{ K.})}{(1033_{mb})(223° \text{ K.})}$$

$$= 0.237$$

where: ρ=density; m=average molecule weight of the gas considered; and N=Avogadro's number.

This calculation is not especially accurate, since m at the high altitude is not equal to m at sea level because the composition of the gases at a high altitude is somewhat different than at lower altitudes. In order to yield a more accurate result, a calculation should be made for each of the gases: nitrogen, oxygen, argon, hydrogen, neon and helium—separately (and also for carbon dioxide). Another stricter approximated calculation can be made, as described hereinbelow.

The volume composition of dry air at sea level is as listed in the following table in column 1. Densities, $\rho_O$ has been indicated for the partial weight in kg of each of these gases in 1 m³ of dry air at sea level at 0 degrees C., according to the calculation of $\rho_O$=(percentage in air)×(molecular weight)×(1/22.443)m³.

The values are listed in column 2 of the table which follows. The sum of these values is 1.29 kg, a value confirmed by additional sources. To calculate air density at high altitude, it is assumed that nitrogen adjacent to the ground, does not float upon the heavier oxygen, because of horizontal winds and the obstacles near the ground, and because vertical winds additionally cause a constant blending of the air. Therefore the volume percentages of these gases near the ground are assumed to be the same as their overall percentage in the atmosphere. This is also true for argon, carbon dioxide, and neon; all of which possess specific gravities not significantly different from one another. Krypton and xenon certainly do not float upon the other gases, since they are heavier, but their quantity is negligible. Only hydrogen and helium float upon other gases and move upwards. Their concentration, therefore, is higher at high altitudes compared with near ground concentrations. Measurements can be made to find hydrogen and helium concentrations. But these two gases do not contribute much to the specific density of air in the atmosphere, since they are relatively light.

The specific density of air at altitudes is determined according to the contribution of the common gases adjacent to the surface height. This is done for each gas separately, according to the equation $\rho=\rho_o e^{-mgh/KT}$ in which $\rho_O$ has been calculated as above and m, ρ, h, K, and T are expressed in MKS units, $$\frac{mgh}{KT} = \frac{(m_{(a.m.u.)})(1.66053 \cdot 10^{-27}_{(Kg)})(9.8_{(m/s^2)})(12000_{(m)})}{1.38062 \cdot 10^{-23}_{(J/° \text{ K.})}(223_{(° \text{ K.})})}$$

$$= (m_{(a.m.u.)}) \cdot 0.063427125$$

yields results as shown in the following table in column 3.

| Gas type | column 1 | column 2 ($\rho_o$, kg) | column 3 (kg) |
|---|---|---|---|
| Nitrogen | 0.7803 | 0.9740625 | 0.1647618 |
| Oxygen | 0.2098 | 0.29914 | 0.0393007 |
| Argon | 0.0094 | 0.0167284 | 0.0013282 |
| Carbon dioxide | 0.0003 | 0.0005882 | 0.0000036 |
| Hydrogen | 0.0001 | 0.0000089 | 0.0000078 |
| Neon | 0.0000123 | 0.000011 | 0.000003 |
| Helium | 0.000004 | 0.0000007 | 0.0000005 |
| Krypton | 0.0000005 | 0.0000018 | |
| Xenon | 0.00000006 | 0.0000003 | |

The sum of weights in column 3 is 0.205438 kg. The ratio between this weight and the weight of air at sea level is 0.159. Therefore, the air density at higher altitude is at least 1/6.28 (i.e. 0.159) than that of sea level. According to this calculation, for a module 25 in the pipeline 10 having the same lift force as for the module at ground level, as discussed above, upper module 120 would require a wall thickness 15 approximately 2.5 times less than the thickness of the lower module. Therefore, if the lower module thickness is 10 mm, then the upper module thickness is 4 mm.

To calculate wind energy, ρ=0.205 kg/m³ and for calculating the wind pressure on the sails 51, a slightly larger value is used, ρ=0.22 kg/m³ to be conservative.

The wind's force on the sail 51 is presently examined. The force on each square meter is, as mentioned:

$$\frac{2\rho(v-v1)(v-3v1)}{-4\rho(v-v1)} = \frac{v-3v1}{-2}$$

The pressure for the fastest jet stream existing in the world, in Japan, at 550 km/hr, is presently calculated yielding pressure (force/m² sail):

$$= (8/9)(0.22)v^2 = 0.196v^2 \mid_{v=550 \text{ km/hour}} = 0.196(153)^2 = 4588Kg$$
$$=153 \text{ m/sec}$$

The maximal force that a large module of the pipeline 10 can bear is presently calculated. (As mentioned, modules may be fabricated with much smaller diameters). The diameter of the large module at ground level is 502 m and its wall thickness is 1 cm. The surface of its intersection is 315,000 cm² (by 2π(502)(0.01)=31.5 m²). If the module is fabricated from conventional steel, which can bear a tension of 3000 kg/cm², then the tension which the pipeline can bear is 945000 tons.

Assuming that the largest pipeline inclination angle allowed, due to the wind's pressure on the sails 51, is 30°, the total wind's force on all the sails would be sin(30)×945,000=472,500 tons.

It was found above that the maximal pressure at the maximal wind in Japan is 4,588 kg/m². This results in the need for 472,500/4.588=102,986 m² of sails 51.

Taking a European jet stream wind, where the maximal wind speed is about 370 km/hr, yields:

$$\text{Force/m}^2 \text{ sail} = 0.196v^2 \mid_{v=370 \text{ km/hour}} = 0.196(103)^2 = 2079Kg$$
$$=103 \text{ m/sec}$$

Therefore, if the maximal inclination angle in Europe for a maximal wind is 20 up to 30°, the total surface of the sails 51 is 472,500/2.073=227,273 m². Allowing an inclination angle of 45°, the maximal horizontal force on the sails 51 is (945,000) (0.707)=668,216 tons. At a wind speed of 550 km/hour, sails with a total surface of 145,644 m² is necessary. At a wind speed of 370 km/hour, sails with a total surface of 321,412 m² is necessary.

It is assumed that total sail surface of 500,000 m², is sufficient for weaker winds. Applying this assumption, at any moment of operation, there are twenty-five working sails 51, with each sail having a surface area of 20,000 m². Using a pipeline, where the diameter at ground level is 502 m and the upper diameter is (502)2.5=1,225 m (in fact, the upper diameter may be somewhat less, because if the lift force of 1 m³ volume of pipe at the heights is 0.1907 kg, as is shown, a diameter of 1,150 m is sufficient). Therefore, the width of the sail 51 may be 1,300 m. According to this, each sail 51 can be fabricated at a height of less than 16 m.

There are many possibilities for the number of sails 51 operating at every moment; the sail width; and the sail height.

The power derived from the sails at a maximal wind speed is calculated from 5 the values calculated above. Power is calculated according to the formula $(8/27)\rho v^3 A$, where A is the sail surface. At a wind speed of 550 km/hr (=153 m/sec) and a maximal inclination angle of 30° P of all the sails=24.04×10³ MW. At a wind speed of 370 km/hr and a maximal inclination angle of 30°, P of all the sails=16.19×10³ MW. For maximal inclination angle of 45°, at a speed of 550 km/hr, P for all the sails 10=34.0×10³ MW. And at speed of 370 km/hr, P of all sails=22.89×10³ MW.

But there is need to prepare for situations in which there is a slower wind. For such cases, there is a need to make the sails with a larger surface area to receive all the possible energy from the wind (with the restriction of the determined inclination angle).

The Force Stretching the Pipeline

It has been found that when the allowable inclination angle of the pipeline 10 for the large diameter pipe is 30°, the allowable force on all the sails together is 472500 tons. In this case, the force stretching the pipeline 10 upward, so that it will not incline at an angle larger than 30°, should be (cos 30°)(945,000)=818,394 tons.

When the allowable inclination angle of this line is 45°, the stretching force is (cos 45°)(94,500)=668,216 tons. The air's density at an altitude of 12 km is, as mentioned above, 0.205438 kg/m³. The density of hydrogen is in proportion to the air, noted previously, about 1/14. Therefore, if the hydrogen weight in the shells is reduced, thereby creating the lift force, this yields about 0.1907 kg/m³.

It appears that the best way to create the force to stretch pipeline 10 upward is to add several pipe sections, which are called "shell pipes", resembling modules, which are attached to the upper end of the pipeline. The shell pipes bear the sails and all components related to the sail system. It is advisable that this attachment too shall be made with two axes, both axes lying in the same imaginary line, just as the attachment binding this construction to the pipeline. In this case, however, the shell pipes have rounded hard caps at the base. To allow pipeline 10 to be laid upon the ground (service, etc.), or even to only reduce its height, thin flexible pipes are attached to it. The thin pipes reach the ground level or the center of the pipeline at a predetermined height. Gas is transferred through the tubes to the shell pipes when needed, to equalize the pressure inside to that of the ambient air pressure at the height where the shell pipes have been lowered.

Regarding stretching the shell pipes, there is a possibility to decide to make three shell-pipes. The length of each one is 1000 m, and the diameter is 1416 m. The wall thickness of the lower part of the lower shell pipe is the same as an upper module wall thickness of the pipeline 10, about 4 mm. The thickness is reduced with increasing height according to the increased diameter, similar to modules in the pipeline 10. Therefore, the lower diameter will be 708 m and the upper diameter will be 739.375 m. Only the next pipe above it will have a much thinner wall, according to the calculation of the remaining stretching force it must transfer. The volume of the lower of the three shell-pipes, including the volume of the upper cap and deducting the volume of the lower cap is about (1.749×10⁹ m³, which yields a lift force on the order of 333,500 tons. The shell pipe's weight, including the upper and lower cap, if it is assumed it is made of a composite substance having a specific gravity of 1.65 g/cm³ is 40,224 tons. The remainder is 293,280 tons of lift force, which is about 36% of the required force for stretching pipeline 10. It is obvious that there will also be systems, as mentioned above, mounted on the shells pipes to reduce the wind's force on them. The lower shell pipe may be made at the same diameter, but it can also be made at a larger diameter than that of upper module 120 of pipeline 10. That is because the ring holding the axis, attaching the shell pipe to the construction, can be made thick enough, so that it will be able to transfer momentum, thus transferring the force.

According to the stretching style of the pipeline 10 discussed, the use of creating a lift force using a cone or a surface having a point mentioned above is only for the construction holding the sail system and the generator 22. The manner of building each sail, so that it can transfer force, and so that there will always be a sufficient amount of sail surface area to receive all of the possible energy of the wind 30 at the maximal inclination angle of the pipeline as determined is as described hereinbelow.

Each sail is made of a frame having a predetermined calculated thickness so that the thickness is sufficient to prevent bending of the frame due to wind's pressure. The frame is made of a suitable light and strong substance (aluminum, steel or a compound substance, for example). It will also have, as needed, strengthening poles. In a free-from-poles area, thin cords may stretch. These cords create a net which holds the sail. The sail can be made from strong cloth or suitable material. In order to prevent the pipeline 10 from inclining at a non-desirable angle, when an unusually strong wind blows at the sail area, the controller/processor 71 controlling the speed of the movement of the sails may be commanded to move the sails at a higher speed. (Regularly, the sails move at a speed of $v_1$=v/3). At a higher speed, the pressure on the sails is reduced and the pipeline 10 does not exceed the maximum inclination angle.

However, this method has a disadvantage. If the original power P is derived, in order to know how $v_1$ changes with changes of P, we differentiate and deriving the pressure formula (the force on m² sail) we obtain:

$$\frac{\partial P}{\partial v_1} = 2\rho(v-v_1)^2(v-3v_1)$$

$$\frac{\partial}{\partial v_1}[2\rho(v-v_1)^2] = -4\rho(v-v_1)$$

The proportion between the two is:

$$\frac{2\rho(v-v1)(v-3v1)}{-4\rho(v-v1)} = \frac{v-3v1}{-2}$$

Examining values of $v_1$ for which this expression is larger than 1:

$$\frac{v-3v_1}{-2} > 1 \Rightarrow 3v_1 - v > 2$$

If the deviation from $v_1$=v/3 is very small the reduction of pressure is larger than the reduction of produced energy. But if the deviation is larger than that—the loss of energy increases at an increasing rate, more than the reduction of pressure on the sails.

There is need to examine if these cases are frequent enough to avoid them. If they are frequent enough—then it is possible to cause a constant, even reduction of pressure and of produced energy. This can be done, for instance, by folding some of the sails during a strong wind, in a manner described later, so that less surface area of sails will work.

Folding of the sails can be performed as follows: The sail material is rolled on a cylinder located on the wind side of the sail. The cylinder moves on a small system composed of two wheels, one behind the other, and the direction of its movement is upward and downward. It moves with the aid of an electric engine. Wheels will move on the frame and are attached to parallel wheels, which are placed on the other side of the frame, and attaching the small system to the frame. The other end of the sail material is fixed to the frame. Motors rolling the sail materials receive a wired or wireless signal from a sensor checking the pipeline inclination. This sensor also gives the signal to stop the rolling when the inclination angle is sufficiently high. All the sails fold together. Some will be working sails and some will be sails in a stowed position. This is done, so that in as the sails are moving, there will not be a change in the total wind force on the sails.

The amount of working square area in the sail line 20 is constant so that the inclination of the pipeline 10 is maintained at the allowed maximum to receive as much power as possible. As mentioned before, the used power for each m² of sails is:

$$\frac{P}{m^2} = \frac{8}{27}\rho v^3$$

And the pressure on each m2 of sail is:

$$\frac{F}{m^2} = \frac{8}{9}\rho v^2$$

The allowed force on all the sails together, to allow maximum inclination of the pipeline, is called "B". Therefore, the working surface area is:

$$B \bigg/ \frac{8}{9}\rho v^3$$

and the total power is:

$$\frac{B(8/27)\rho v^3}{(8/9)\rho v^2} = B\left(\frac{1}{3}\right)v$$

As a result, the power which the system produces (in watts) increases proportionally with v.

Note that the shells pipes described hereinabove, and which stretch the pipeline 10, have been described as having a wall thickness of 4 mm and a cap thickness of 1 mm. Should it become evident, that it is not worthwhile to use a substance having stretching strength over 30-kg/mm, there will be a need to make the pipe approximately twice as thick (with an according increase in the pipeline's upper pipe's thickness and for some of the modules 25 beneath it). The thickness of the caps should be made 2.5 times than mentioned. This fact does not cause any problem, since the lift force remains much greater than the weight, because the lift force is larger by one order of magnitude than the weight.

An Additional Description of the Sail-Line, and System Operation

Since the sails are located on sail line 20 one after the other, to allow the wind to reach all the sails 51 and not only the first one, the sail line should move constantly, upward and downward. Movement of pipeline 10 at a small angle back and forth will allow this. This is accomplished by compressing gas to the stretching shells-pipes and its extraction, or by ballasting the shells by means of additional water, as described hereinabove. This can also be done by an additional sail, which is located above the pipeline 10, in such a way that does not interfere with the working sails 51. In some embodiments, this sail inclination angle is controlled by a processor.

It is possible to determine another metric of sail-to-wind velocity of 1/3, should it become evident, that the metric is not appropriate. In order to obtain an alternative metric, the distance between sequential sails 51 should be equal to the desired maximal wind speed, multiplied three times by the time it takes the sail line 20 to rise to a height, equal to the sail height. If, for instance, the maximal wind's speed is 540 km/hour, which is 150 m/second and the height of the sail is 30 meters, and it takes the sail line 15 seconds to rise, the distance between the sequential sails is: (150) (15)3=6750 m.

Should there be twenty-five sails in the sail line 20; the length of the sail line is 169 km. In principle, in some embodiments, there is no restriction on the sail line length, since each section of the sail line possesses one or more buoyancy shells or floats 65 (FIG. 14), which provide lift. The only restrictions are production expenses and ease of maintenance. Shortening of the line can be caused, if the pipeline's vibration frequency be increased, or if less stringent criteria than the one discussed herein (multiplication by 3) is chosen.

In order for the sails to receive fresh wind, sail line 20 should be above the pipeline 10 and under the height of the shells-pipes. This is achieved by using sufficiently long aerodynamic poles 24. The poles 24 emerge from the large bearing 122 attached to the top of pipeline 10. The poles 24 are sufficiently long, so that the distance between the top of pipeline 10 and the bottom of the stretching shells pipes is at least three times than of the sail height. To prevent bending of the aerodynamic poles, construction bearing the sails 51 and all components connected to them should be attached to the aerodynamic poles by a joint installment, for instance, by a ring in which there is an axis or hinges, which will be attached to the construction and also the attachment from above, between the construction and the lower shell-pipe by a hinge found on a large ring. The ring is attached to other aerodynamic poles which are attached to the lower shell-pipe. In addition, for the sails that are returning after working at the front of the sail line 20 not to disturb the fresh wind coming to the sail, it is preferable that the returning sails move from the side and not from below. It is also preferable, that the shells holding the sail line 20 in the air are positioned from both sides of the sail line and not from above or under. Therefore, all the working chains, which are moved by the sails, are maintained 90 degrees relative to the situation described above.

Embodiments of the invention take advantage of the jet streams in order to produce electricity by means of the pipeline 10 bearing itself by light gases, and which also stretches with the aid of light gases, and by sails moving in the wind's directions. All the other details, such as making the generators 22, which produce electricity at heights, instead of sending one more pipes below in order that the turbines will be on the ground, the details of the sails and the frame in which they move, and the means of passing the force between the sails and the electricity producing generators are all examples, and these details can be made in different ways. Another example is the quick transfer of the wind's energy to electrical energy and not to another energy form.

Table of radius values and the lower pipe length for which the lift force on the pipe is greater than the pipe's weight
The weight of the module 25 has been calculated as if it were made of steel.

| For the module, holding the gas in it | | For the module with a round and cone-shaped shell from all sides | |
|---|---|---|---|
| Radius in meters | length in meters | Radius in meters | length in meters |
| 165 | 529 | 1 | 81 |
| 166 | 443 | 6 | 106 |
| 167 | 382 | 11 | 131 |
| 168 | 337 | 16 | 136 |
| 169 | 311 | 21 | 141 |
| 170 | 273 | 26 | 146 |
| 171 | 249 | 31 | 151 |
| 172 | 230 | 36 | 156 |
| 173 | 213 | 41 | 161 |
| 174 | 199 | 46 | 156 |

FIGS. 14-19 relate to a wind energy capture apparatus, whose main component is sail line 20 and therefore the terms "wind energy capture apparatus" and "sail line", or their derivatives, may be used interchangeably herein the specification and claims. The wind energy capture apparatus is disposed at the top of the tower/pipeline 10 and thus the term "jet stream", and its derivatives, and the term "wind" and its derivatives, may be used interchangeably herein the specification and claims. Although the present sail line is considered to be particularly useful for helping harness kinetic energy of jet streams, the sail line may be useful for helping attain useful energy from winds at other altitudes, and no limitation is implied regardless of context herein the description or claims.

Figure 14:
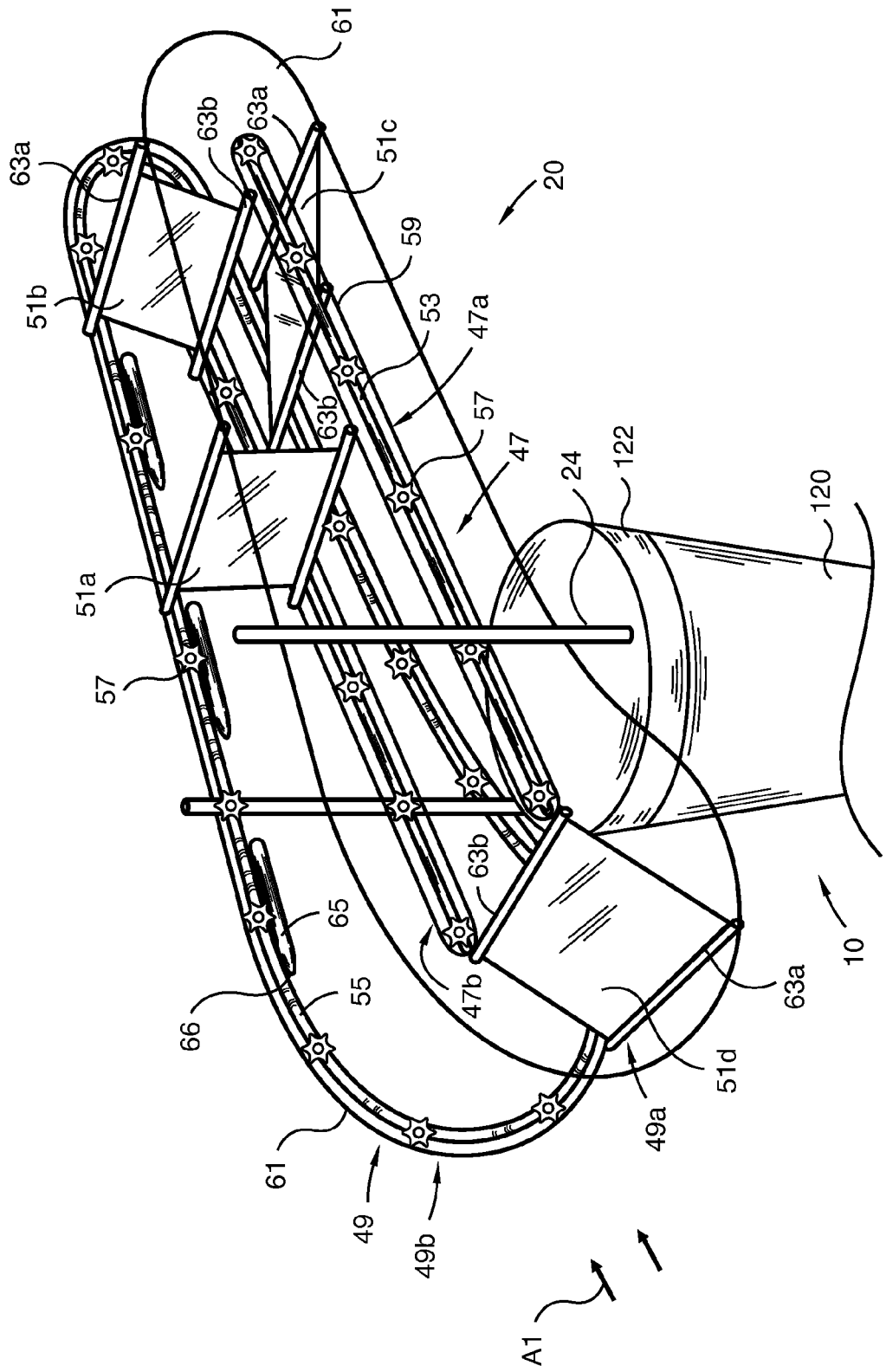
FIG. 14 is a perspective view of an embodiment of the sail line at the top of the tower.

FIG. 14 shows sail line 20 attached to a pair of spaced apart upwardly extending sail line holding poles 24 that are attached to a rotatable bearing 122 at the top of uppermost module 120. Rotatable bearing 122 allows sail line 20 to point downwind from the wind freely regardless of the direction of the wind, like a weather vane. Arrows A1 indicate the wind direction. Poles 24 are shown disposed at or near the periphery of bearing 122, but can be disposed in any manner suitable for the design of a workable sail line. In some embodiments, the sail line holding poles 24 are aerodynamically shaped, for example, with a generally triangular shape and/or having a leading (windward) edge with an extended "airplane nose"-like shape.

Sail line 20 includes a first sail track 47, including a first pair of sail tracks, which for convenience of description may also be referred to as a left sail track 47a and a right sail track 47b; and a second sail track 49 including a pair of sail tracks, which for convenience of description may also be referred to as a left sail track 49a and a right sail track 49b. For reasons of visibility, sail track 49b is schematically depicted as a loop without any components, however, track 49b includes the same components as track 49a.

Figure 15A:
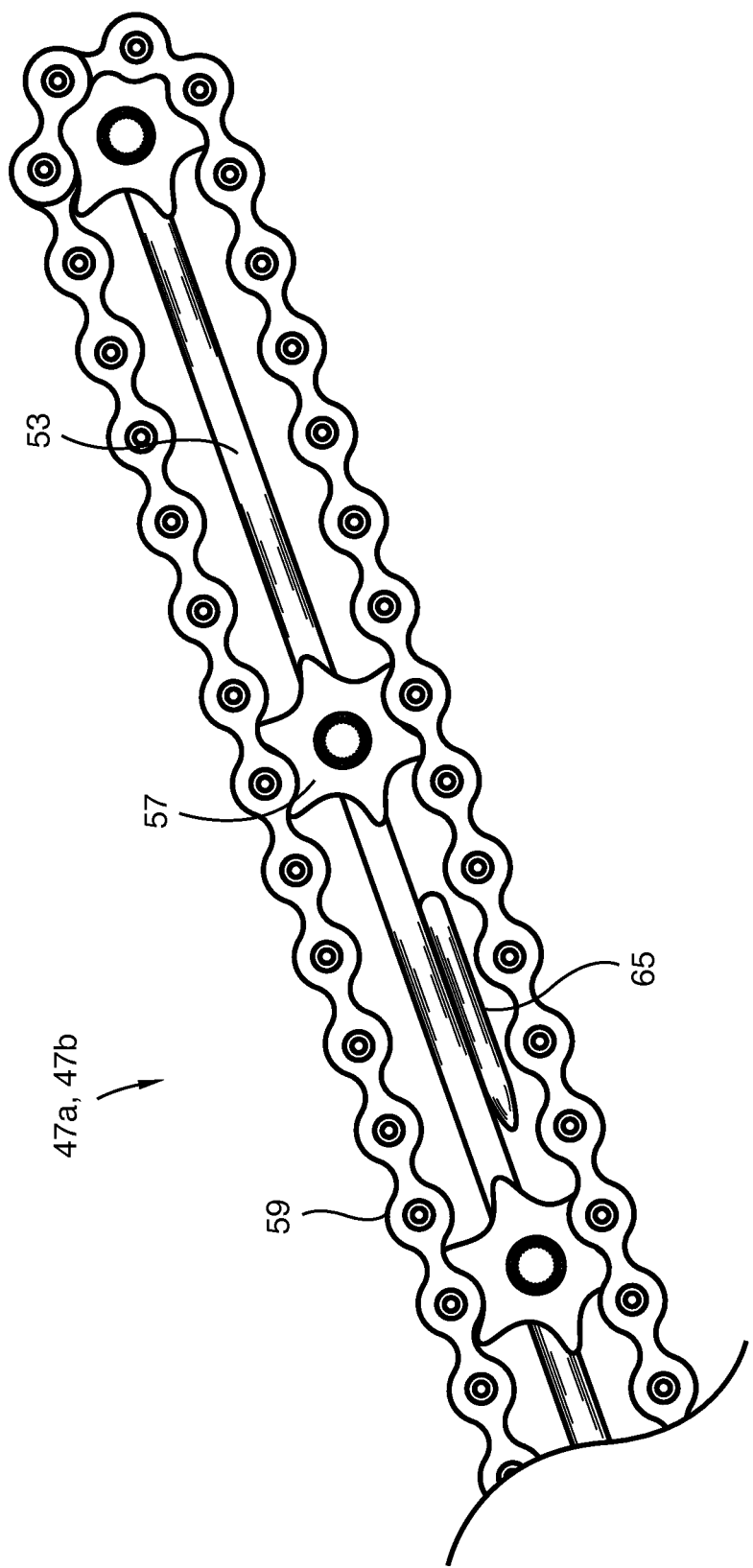
FIGS. 15A-15B are plan views of details of embodiments of sail line tracks of the sail line of FIG. 14.

With reference also to FIG. 15A, each of the first pair of sail tracks (left sail track 47a and right sail track 47b) include (a) a first sail-line chain support beam 53, i.e. there are a pair of such beams, each first sail-line chain support beam connected, typically at or near its proximal end, to upwardly extending sail line holding poles 24; 20 (b) a plurality of spaced-apart rotatable chain gears 57 connected to each of the first sail-line chain support beams 53; and (c) a first pair of sail-line chains 59 that ride upon the rotatable chain gears 57 of respective beams of the first pair of beams 53, generally analogously to a bicycle chain.

First sail-line chain support beams 53 are generally straight and their associated sail-line chains 59 are typically parallel to beams 53, i.e. are adjacent the lower side of spaced-apart rotatable chain gears 57 as well as adjacent when riding on the upper side of those chain gears. As such, each of the pair of sail-line chain support beams 53 typically defines the shape of their respectively associated chains 59.

Figure 15B:
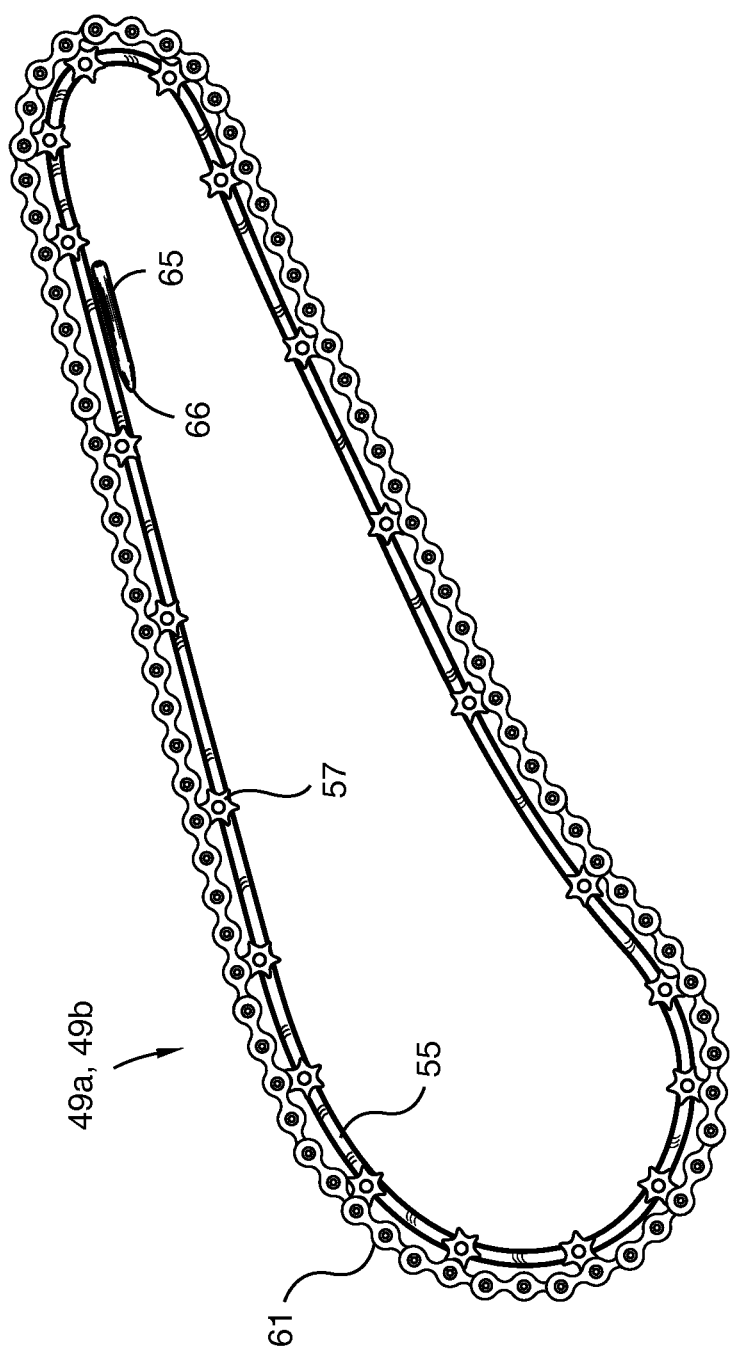

With reference also to FIG. 15B, each of the second pair of sail tracks (left sail 49a and right sail track 49b) include (a) a second sail-line chain support beam 55, i.e. there are a pair of such beams, each second sail-line chain support beam connected, typically at or near its proximal end, to upwardly extending sail line holding poles 24; (b) a plurality of the spaced-apart rotatable chain gears 57 connected to each of the second sail-line chain support beams 55; and (c) a second pair of sail-line chains 61 that ride upon the rotatable chain gears 57 of respective beams of the second pair of beams 55, generally analogously to a bicycle chain.

Second sail-line chain support beams 55 are generally oval, though with the upwind side being a bit wider and including a "tear-drop"-like or belly shape, i.e. a dip. Each of the pair of sail-line chain support beams 55 typically defines the shape of their respectively associated chains 61.

The planes of each of the sail tracks 47a and 47b are parallel, in particular chains 59 are parallel, i.e. do not converge or diverge. Likewise sail tracks 49a and 49b are parallel, in particular chains 61 are parallel, i.e. do not converge or diverge.

Figure 16A:
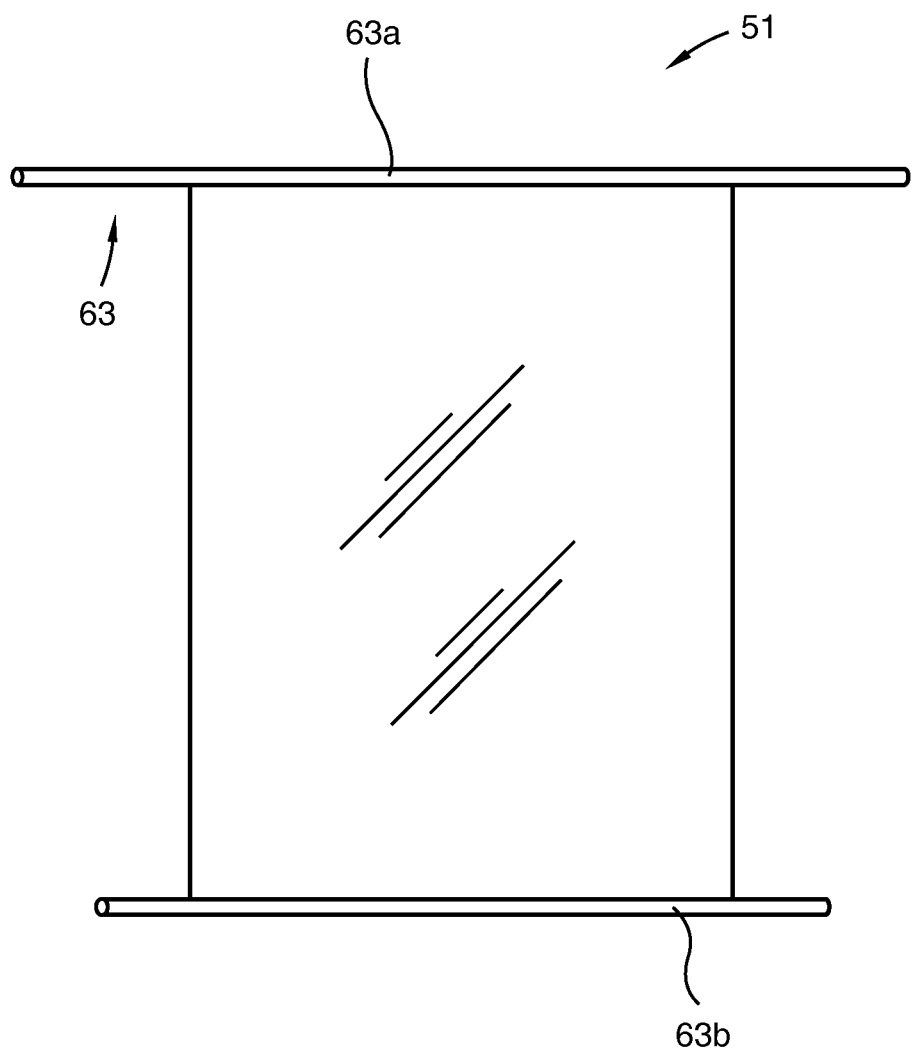
FIGS. 16A-16C are plan views of embodiments of sails of the present sail line.
Figure 16B:
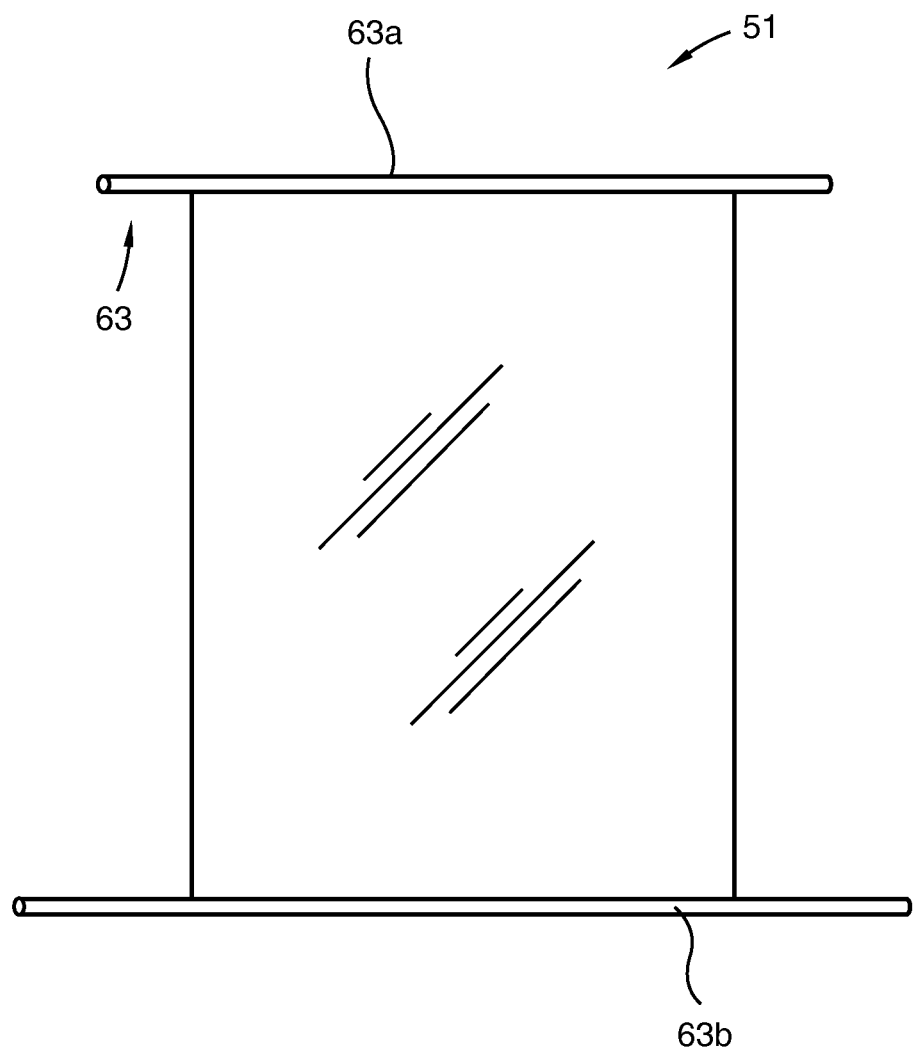
Figure 16C:
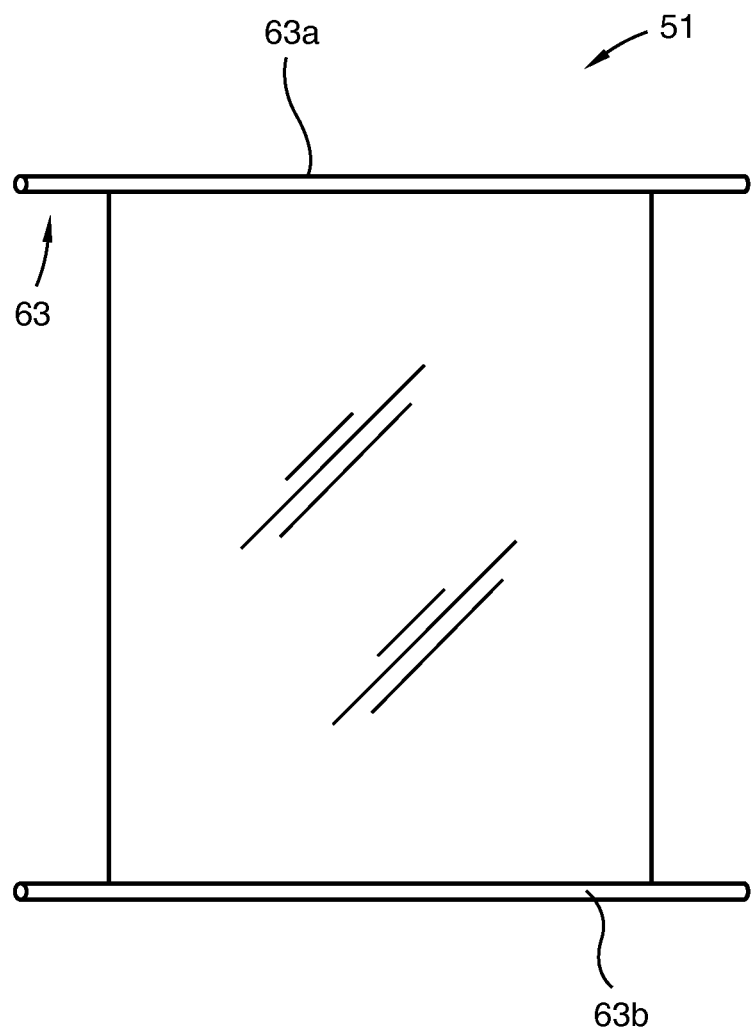

FIGS. 16A-16C show exemplary embodiments of sail 51. Sail line 20 includes at least one sail 51, and most typically a plurality of sails (indicated for description purposes as sails 51a, 51b, 51c and 51d in FIGS. 14 and 19). Sails 51 have a sail frame 63, for example including a first sail frame bar 63a and a second sail frame bar 63b. First sail frame bar 63a is shown as the upper frame bar and second sail frame bar 63b is shown as the lower frame bar; however, during operation the juxtaposition of the bars 63a and 63b will change, as will be understood from the description below.

Sail frames 63 help maintain the shape of sails 51 and facilitate connection of the sails to the two pair of sail line chains 59 and 61. Sail frames 63 are connected to sail line chains 59 and 61 (i.e. at a particular repeat chain segments of the chains) that ride on gears 57 of first and second chain support beams 53 and 55.

Movement of the Sails 25

Sails 51 are moved downwind by the wind impacting on generally upright sails, such as sails in the general position of sail 51a, as illustrated in FIG. 14. Thus, sail 51a is moved "downstream" by the wind in the direction of sail 51b, which is also simultaneously moving downwind. Sail 51a will thus be pushed by the wind to the position of sail 51b where the sail will begin to rotate as it reaches the downwind end of sail line 20.

When each sail 51 reaches the downwind end of sail line 20, the sail is partially rotated (spins somewhat) prior to moving upwind into the wind. The partial rotation of the sails 51 is so that the sails will be positioned so that there will be reduced wind resistance when the sails move upwind against the wind.

In the embodiment illustrated in FIG. 14, at the downwind end of sail line 20 the sails 51 are partially spun wherein first sail frame bar 63a is lowered in the downwind direction, by the connection of second sail frame bar 63*a* with chains 61. Second sail frame bar 63*b*, attached at its ends to chains 59 follows the path of those chains and is moved downward, relatively slightly. After the partial spin, approximately a one-quarter rotation, the sails assume a position like that of sail 51*c*, which are then moving upwind against the wind, with second sail frame bar 63*b* becoming the "leading edge" against the wind.

When the sails 51 reach the upwind end of sail line 20, the sails will again partially rotate/spin so as to return to their generally upright position. First sail frame bar 63*a* will be moved downward on chains 61 and pass below second sail frame bar 63*b*, at one point assuming the position illustrated by sail 51*d*. Then first sail frame bar 63*a* will continue moving, now upward, at the very front (upwind side) of sail line 20 until the sail is again in a generally upright position (e.g. as in the position illustrated by sail 51*a*) whereby the wind will again move the sails downwind, the wind imparting its kinetic energy to the sails and chains 59 and 61, and thus rotation to gears 57.

Sails 51 are typically spaced apart from each other to a considerable degree whereby upwind sail(s) do not, or do not significantly, block wind impinging on downwind sails. In some embodiments, sail line 20 is held in a proper position (generally perpendicular to tower/pipeline 10 or angled somewhat upward) by one or more floats 65 attached to chain support beams 53 and 55 (FIGS. 14 and 15A-15B). The one or more floats 65 are filled with a lighter than air gas such as hydrogen or helium and typically attached to the sides of beams 53 and 55. As noted, in some embodiments, floats 65 are designed and/or positioned so that sail line 20 is slightly angled, i.e. the front of the sail line (the side facing the jetstream) points somewhat downward and the rear faces somewhat upward, whereby there is less of a tendency for the sails collecting the wind energy to block the downwind sail(s). In the illustrated case, this means less of a tendency for sails in the position of sail 51*a* to block the jetstream from impinging on downwind sails, such as in the position of sail 51*b*. In some embodiments, floats 65 have an aerodynamic (e.g. tapered) upwind end 66.

As illustrated, in some embodiments, first sail frame bar 63*a* is somewhat longer than second sail frame bar 63*b* (FIG. 16A), or vice versa (FIG. 16B). The difference in sail frame bar length may be helpful to avoid potential interference of the sails 51 and the tracks 47 and 49, especially during spinning of the sails when the sails reach the front and rear of sail line 20. Or, in some embodiments, the sail frame bars 63*a* and 63*b* may be the same length (FIG. 16C).

Alternatively or in conjunction with embodiments where the sail frame bars 63*a* and 63*b* are of differing lengths, in some embodiments, gears 57 may be attached to beams 53 and 55 so that the gears are spaced apart from the beams so as to position chains 59 and 61 whereby bars 63*a* and 63*b* of sails 51 do not interfere with the rotation/spinning of the sails.

Figure 17:
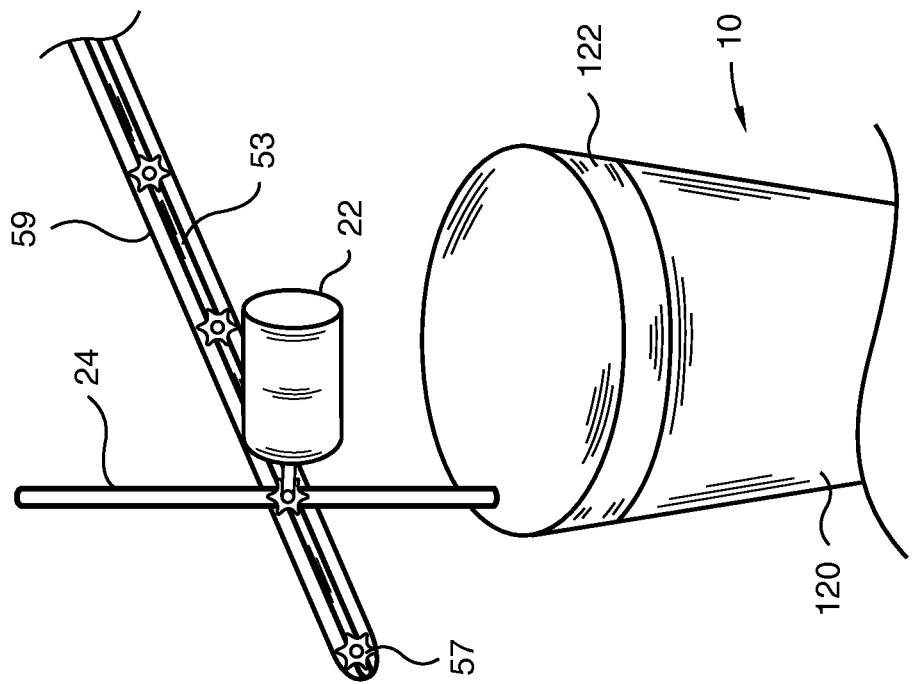
FIG. 17 is a perspective view illustrating how a generator may be connected to the sail line.

As illustrated in FIG. 17, one or more generators 22 are operably connected to one or more chain gears 57, typically most conveniently to the chain gears adjacent to upwardly extending poles 24, whereby the generators receive rotational energy for producing electrical energy. Generators 22 can be attached to chain gears 57 of both first sail track 47 and second sail track 49. It should be understood that generators 22 are located so that there is no interference with sails 51.

Figure 18:
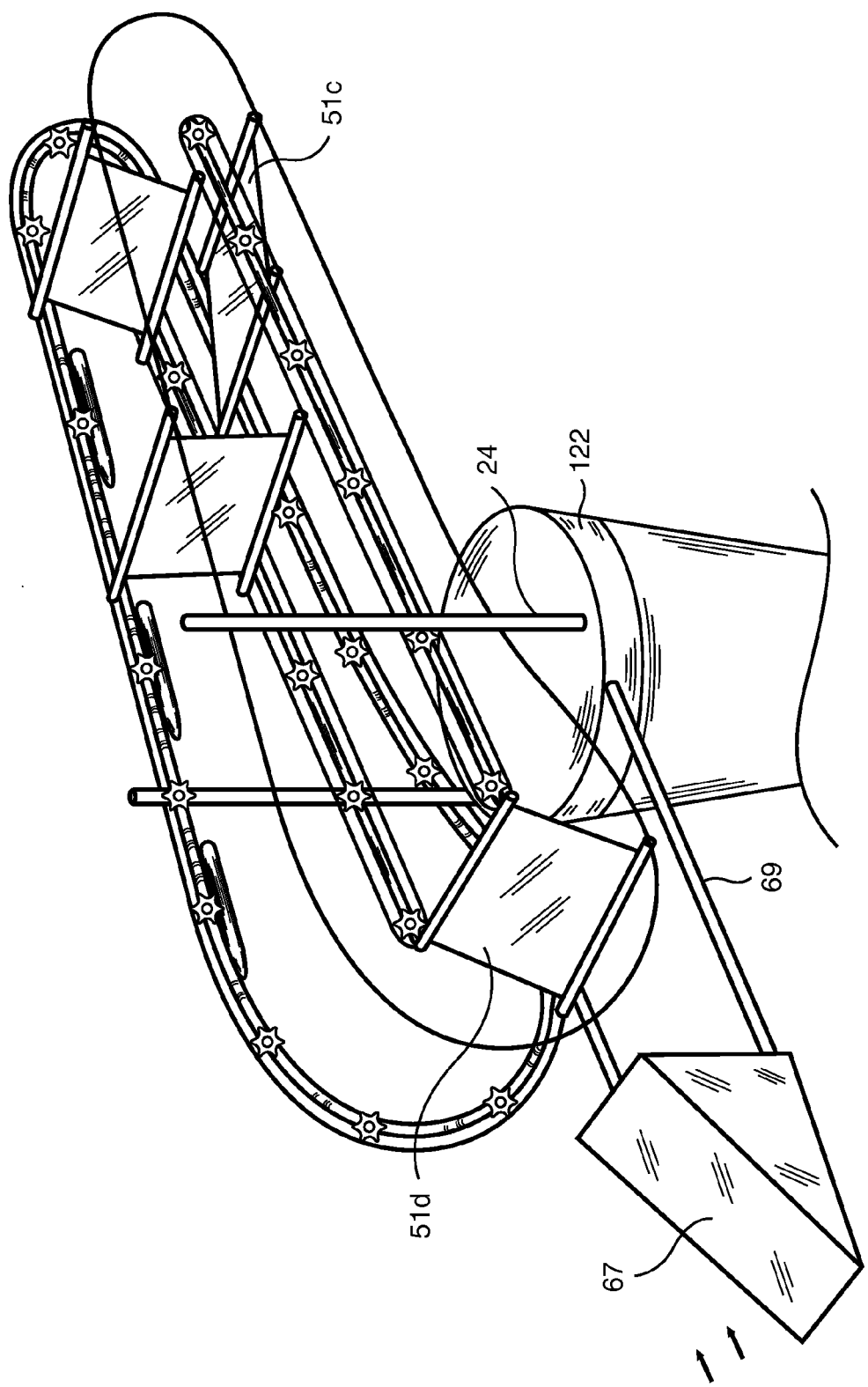
FIG. 18 is a perspective view of another embodiment of the sail line further including a wind deflector.

FIG. 18 shows an embodiment wherein sail line 20 further includes a wind deflector 67, typically a wedge-shaped body for deflecting jetstream wind from impinging sails (see sails 51*c* and 51*d*) that are moving "upstream" (sail 51*c*) and are beginning to rotate (sail 51*d*) at the front of the sail line. Wind deflector 67 can be attached, as shown, to the tower/pipeline 10 by wind deflector attachment beams 69 to bearing 122, as shown, whereby the deflector turns with sail line 20 even if the wind direction changes. Alternatively, wind deflector attachment beams 69 can be attached at upwardly extending sail line holding poles 24, typically at or near the base of poles 24.

In some embodiments, the use of deflector 67 may make the generally parallel orientation of the sails 51 unnecessary whereby the tracks 47 and 49 need not be designed as shown, rather the tracks can be designed so that the sails are more upright when travelling in the upwind direction, mutatis mutandis.

In some embodiments, sail line 20, which is connected to holding poles 24 is pivotably connected to those holding poles to allow the sail line to be angled, as mentioned above, which can be useful in the design and operation of the sail line. Regardless, in some embodiments, sail line 20 is fixedly connected to holding poles 24.

Figure 19:
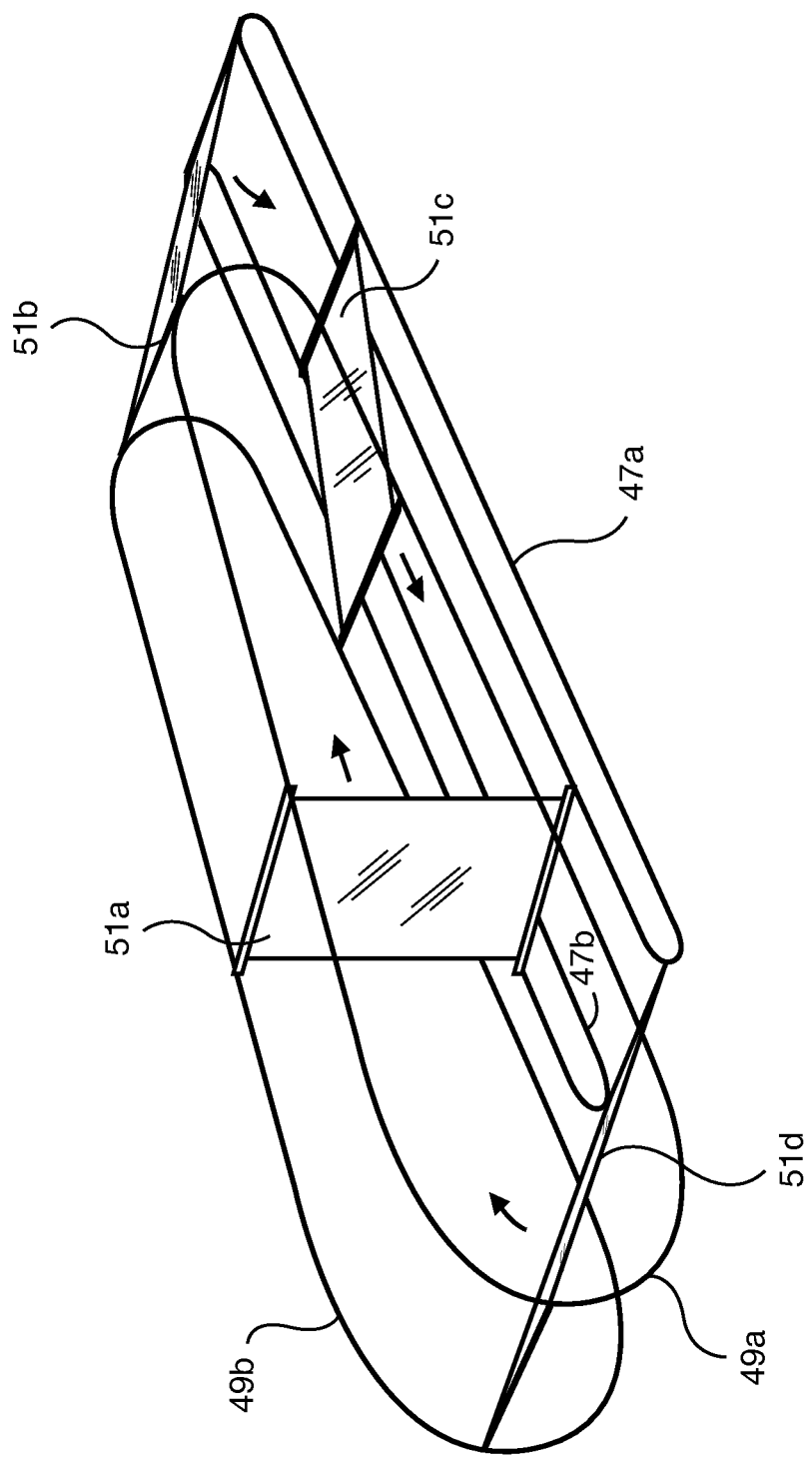
FIG. 19 is a perspective view of another embodiment of the sail line.

FIG. 19 shows another embodiment where left sail track 49*a* and right sail track 49*b* (i.e. chains 61 and second beams 55, which are not shown in FIG. 19, for the sake of visualization) have a generally oval shape, though in some embodiments may be a bit more spread (taller) at the upwind end. This shape, in conjunction with the juxtaposition of first chains 59 and second chains 61 (discussed immediately below) allow for rotation of sails 51 in a different, and what might be considered "opposite", rotational direction than as in the embodiment of FIG. 14.

In this embodiment, first sail tracks 47 typically have the same shape as in FIG. 14; however, the tracks extend further outward (toward the right in FIG. 19) relative to second tracks 49. Also, first sail tracks 47 are disposed below second tracks 49, in contrast to the embodiment of FIG. 14, where second tracks 49 "surround" first tracks 49 (i.e. tracks 49*a* and 49*b* respectively surround tracks 47*a* and 47*b*).

Again, regardless of the different rotation of the sails at the down-wind and upwind ends of beams 53 and 55, the overall shape and juxtaposition of chains 59 and 61 allow for sails 51 to lay approximately parallel to first beams 53 when moving up-wind, thus have less resistance when the sails return to the upwind position.

Figure 20:
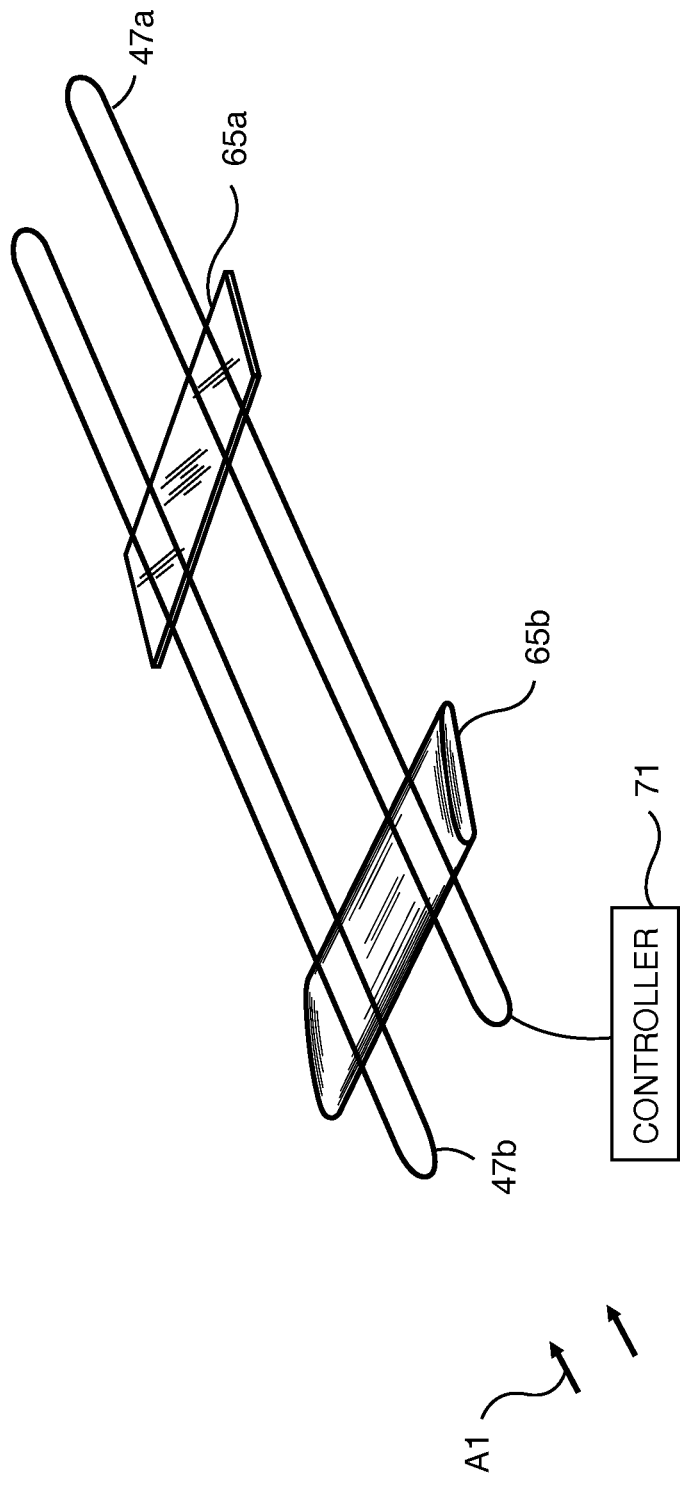
FIG. 20 is a perspective view of another embodiment of the sail line illustrating exemplary sail line positioning mechanisms.

FIG. 20 shows additional embodiments of sail line 20 depicting additional or alternate sail line lifting or positioning members for helping maintain the position of the sail line. These sail line positioning members can be used in addition to, or instead of floats 65. One exemplary lifting member (and more than one can be used) is in the form of an angled sail line lifting member 65*a*; and another is in the form of an airplane wing-like shaped sail line lifting member 65*b* to provide lift to the sail line. Angled lifting member 65*a* is a sturdy component that is angled slightly downward in the downwind wind direction whereby when the wind impacts the angled sail line lifting member 65*a*, the downwind end of sail line 20 is raised with respect to the upwind end thereof. Collectively, floats 65 and lifting members 65*a* and 65*b* can be termed a sail line angling or positioning mechanism. Lifting members 65*a* and 65*b* are illustrated below the sail line 20, specifically below and operably attached to first and second sail tracks 47*a* and 47*b*; however some or all of the lifting members can be located in different positions, for example above or to the side of sail line 20. In some embodiments, the speed of sails 51 moving on chains 59 and 61 is controlled to be about ⅓ of the speed of the jetstream, without limitation. In some embodiments, such speed control may be maintained by the controller/processor 71 (FIG. 20), as noted above with discussion of preferred sail speed.

Note: there may be more or fewer sails 51 than shown. Typically, the sails are spaced apart more or less equidistantly, and not shown as such for the sake of clarity.

Whether noted above specifically or not, it should be understood that all the sail line components are preferably designed to be aerodynamic.

In some embodiments, to overcome, preclude or reduce any possible issue of chains 59 and 61 moving at different speeds, and/or to ease rotation of the sails 51 at the front and rear ends of sail line 20, and/or to ameliorate any issues with the change in momentum, especially when the sails 51 reach the ends of tracks 47 and 49, a "transmission" mechanism can be employed; such as used when cable cars (or a ski chairlift) comes off the track during loading/unloading of passengers.

In some embodiments, to overcome, preclude or reduce any possible issue of the change in momentum of sails 51 when the sails reach the ends of tracks 47 and 49, the ends of the tracks are designed to have gentle curves at their ends.

It will be appreciated that the above descriptions are intended only to serve as examples, and that many other embodiments are possible within the scope of the present invention as defined in the appended claims.

The invention claimed is:

1. A wind energy capture device for use in conjunction with a mechanism for securing the wind energy capture device at high altitudes, the device comprising:
a first pair of essentially parallel sail line tracks, each track of said first pair of parallel sail line tracks comprising:
a first sail-line chain support beam operably connected to the mechanism for securing the wind energy capture device at high altitudes;
a plurality of spaced-apart rotatable chain gears rotatably connected to the first sail-line chain support beams of each track; and
a first sail-line chain that rides upon the rotatable chain gears of the first sail-line chain support beams of each track,
a second pair of essentially parallel sail line tracks, each track of said second pair of parallel sail line tracks comprising:
a second sail-line chain support beam operably connected to the mechanism for securing the wind energy capture device at high altitudes;
a plurality of spaced-apart rotatable chain gears rotatably connected to the second sail-line chain support beams of each track; and
a second sail-line chain that rides upon the rotatable chain gears of the second sail-line chain support beams of each track,
at least one generator operably and respectively attached to at least one of said gears; and
at least one sail having a sail frame attached to said first sail-line chain of each track of said first pair of parallel sail line tracks and to said second sail-line chains of each track of said second pair of parallel sail line tracks,
whereby the sails move along said pairs of first and second essentially parallel sail line tracks on said first and second chains in a cyclical downwind and upwind path thereby moving the first and second chains to rotate their respective first and second chain gears, which in turn provides energy to the at least one generator,
wherein the device further comprises a sail line positioning mechanism operably attached to each sail line track and the sail line positioning mechanism is selected from the group consisting of: at least one float; at least one angled sail line lifting member that is angled slightly downward in the downwind direction; at least one airplane wing-like shaped sail line lifting member; and any combinations thereof.

2. The device of claim 1, wherein the first and second tracks are configured so that the sails are generally upright with respect to the wind when moving in the downwind direction and generally parallel with respect to the wind when moving in the upwind direction.

3. The device of claim 1, wherein the second track is disposed above the first track.

4. The device of claim 1, wherein the second track surrounds the first track.

5. The device of claim 1, wherein the sail frame comprises a first sail frame bar and a second sail frame bar.

6. The device of claim 1, further comprising a wind deflector disposed upwind of said first pair of parallel sail line tracks.

7. The device of claim 1, further comprising a computer/processor configured to control the speed of the sails.

8. The device of claim 7, wherein the computer/processor is configured to control the speed of the sails to a speed between about one third to one half of the speed of the wind.

* * * * *